United States Patent
Kruzel et al.

(10) Patent No.: US 11,859,742 B2
(45) Date of Patent: Jan. 2, 2024

(54) WIRE BASKET BRACKET

(71) Applicant: Panduit Corp., Tinley Park, IL (US)

(72) Inventors: Mateusz Kruzel, Orland Park, IL (US); Russell K. Morrow, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 33 days.

(21) Appl. No.: 17/945,544

(22) Filed: Sep. 15, 2022

(65) Prior Publication Data

US 2023/0008506 A1    Jan. 12, 2023

Related U.S. Application Data

(63) Continuation of application No. 17/176,385, filed on Feb. 16, 2021.

(60) Provisional application No. 62/979,022, filed on Feb. 20, 2020.

(51) Int. Cl.
*F16L 3/10* (2006.01)
*H02G 3/04* (2006.01)

(52) U.S. Cl.
CPC .............. *F16L 3/10* (2013.01); *H02G 3/0443* (2013.01)

(58) Field of Classification Search
CPC ............ H02G 3/30; H02G 3/263; H02G 3/32; H02G 3/0433; H02G 3/0608; H02G 3/06; H02G 3/0456; F16L 3/10
See application file for complete search history.

(56) References Cited

U.S. PATENT DOCUMENTS

| | | | | |
|---|---|---|---|---|
| 3,288,192 A | * | 11/1966 | Bollinger | F16B 35/048 403/353 |
| 3,765,634 A | * | 10/1973 | Stempel | F16B 7/0433 403/384 |
| 4,226,193 A | | 10/1980 | Gindel | |

(Continued)

FOREIGN PATENT DOCUMENTS

| | | |
|---|---|---|
| AU | 2010202135 A1 | 1/2011 |
| CN | 103872628 A | 6/2014 |

(Continued)

OTHER PUBLICATIONS

"Wire Mesh Cable Tray / Basket Clips"; CMP Products, Limited; Mar. 29, 2019, XP055818982, retrieved from the Internet: URL: https://web.archive.org/web/20190322161450/; https://www.cmp-products.com/cleats/products/cable-cleat-accessories/wire-mesh-cable-tray-basket-clips/; Retrieved on Jun. 29, 2021.

*Primary Examiner* — Christopher Garft
(74) *Attorney, Agent, or Firm* — Christopher S. Clancy; James H. Williams; Aimee E. McVady

(57) ABSTRACT

A bracket designed to mount a cable management assembly to a wire basket. The bracket includes a bracket frame and a locking plate. The bracket frame has a base with a first end and a second end, a first sidewall extending from the base, and a second sidewall extending from the base. The first side wall and the second wall each include notches for receiving the wire basket. The locking plate is secured to the bracket frame. The locking plate having a base with a first end and a second end, a first sidewall extending from the base, and a second sidewall extending from the base. A fastener secures the bracket frame and the locking plate to the cable management assembly.

20 Claims, 22 Drawing Sheets

(56) References Cited

U.S. PATENT DOCUMENTS

| | | | |
|---|---|---|---|
| 6,454,487 B1* | 9/2002 | Buenning | B62B 3/142 |
| | | | 403/389 |
| 7,055,786 B2 | 6/2006 | Garassino et al. | |
| 7,540,244 B2 | 6/2009 | Gregory | |
| 8,250,717 B2 | 8/2012 | Boone | |
| 9,770,138 B2* | 9/2017 | Engell | A47B 57/26 |
| 10,371,314 B2 | 8/2019 | Mann | |
| 2003/0108385 A1* | 6/2003 | Finco | H02G 3/0608 |
| | | | 403/396 |
| 2003/0156892 A1* | 8/2003 | Finco | H02G 3/0443 |
| | | | 403/110 |
| 2004/0104322 A1 | 6/2004 | Hennequin | |
| 2006/0038091 A1* | 2/2006 | Winn | H02G 3/0608 |
| | | | 248/49 |
| 2015/0078809 A1* | 3/2015 | Winn | H02G 3/0443 |
| | | | 403/188 |
| 2019/0186684 A1 | 6/2019 | Mann | |
| 2020/0244055 A1* | 7/2020 | Cretella | H02G 3/0437 |

FOREIGN PATENT DOCUMENTS

| | | |
|---|---|---|
| DE | 2036325 A1 | 1/1972 |
| EP | 1193820 A1 | 4/2002 |
| EP | 1376807 A1 | 1/2004 |
| EP | 1318585 B1 | 9/2008 |
| EP | 1335464 B1 | 4/2009 |
| EP | 1964225 B1 | 2/2013 |
| EP | 2378620 B1 | 7/2016 |
| EP | 2829780 B1 | 3/2017 |
| EP | 2254211 B1 | 9/2018 |
| GB | 2031507 A | 4/1980 |
| GB | 2473492 B | 3/2011 |
| WO | 27005 A1 | 5/2000 |

* cited by examiner

WIRE BASKET BRACKET

CROSS REFERENCE TO RELATED APPLICATION

This application is a continuation of U.S. patent application Ser. No. 17/176,385, filed Feb. 16, 2021, and claims benefit to U.S. Provisional Patent Application No. 62/979,022, filed on Feb. 20, 2020, the entirety of which is hereby incorporated by reference herein.

FIELD OF THE INVENTION

The present invention generally relates to brackets for wire baskets, and, more specifically, to brackets for fastening cable management assemblies to wire baskets.

BACKGROUND

Cable management assemblies, such as cable cleats or cleat assemblies are typically used to manage and secure 3-phase power cables of various sizes in a trefoil arrangement along a cable ladder or ladder rung. In addition to securing cables laterally and axially, cable cleats must be rigid enough to retain cables during short-circuit events, where electromagnetic forces can cause the cables to repel one another at extremely high forces. Cable cleats hold the cables in place during a short-circuit event to prevent damage to people and property.

Typically, cable cleats are secured to a ladder rung using a bolt and nut inserted through the cable cleat and the ladder rung. One example installation is exemplified U.S. patent application Ser. No. 16/252,962 incorporated by reference here, in its entirety. Certain electrical cable installations, however, need to be mounted on a wire basket instead of a standard ladder rack. In these installations, the known attachment means utilized to mount the cable cleat to the ladder rung will not sufficiently secure the cable cleat to the wire basket.

Therefore, there is a need for a bracket for safely and securely mounting a cable management assembly that can be used to manage and secure 3-phase power cables to a wire basket.

SUMMARY OF THE INVENTION

The present invention is directed to a bracket that mounts a cable management assembly to a wire basket. The bracket includes a bracket frame and a locking plate. The bracket frame has a base with a first end and a second end, a first sidewall extending from the base, and a second sidewall extending from the base. The first side wall and the second wall each include notches. The locking plate is secured to the bracket frame. The locking plate has a base with a first end and a second end, a first sidewall extending from the base, and a second sidewall extending from the base. A fastener secures the bracket frame and the locking plate to the cable management assembly.

The present invention is also directed to a wire basket assembly that mounts a cable cleat assembly to a wire basket. The wire basket assembly includes a wire basket and a wire basket bracket. The wire basket has a first plurality of cross wires disposed parallel to each other and a second plurality of cross wires disposed parallel to each other and perpendicular to the first plurality of cross wires. The first plurality of cross wires and the second plurality of cross wires form a grid. The wire basket bracket is secured to the wire basket. The wire basket bracket includes a bracket frame and a locking plate. The bracket frame has a base with a first end and a second end, a first sidewall extending from the base, and a second sidewall extending from the base. The first side wall and the second wall each include notches for receiving cross wires of the wire basket. The locking plate has a base with a first end and a second end, a first sidewall extending from the base, and a second sidewall extending from the base. A fastener secures the bracket frame and the locking plate to the cable cleat assembly.

BRIEF DESCRIPTION OF THE DRAWINGS

Certain examples of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular examples illustrated herein.

DETAILED DESCRIPTION

Figure 1:
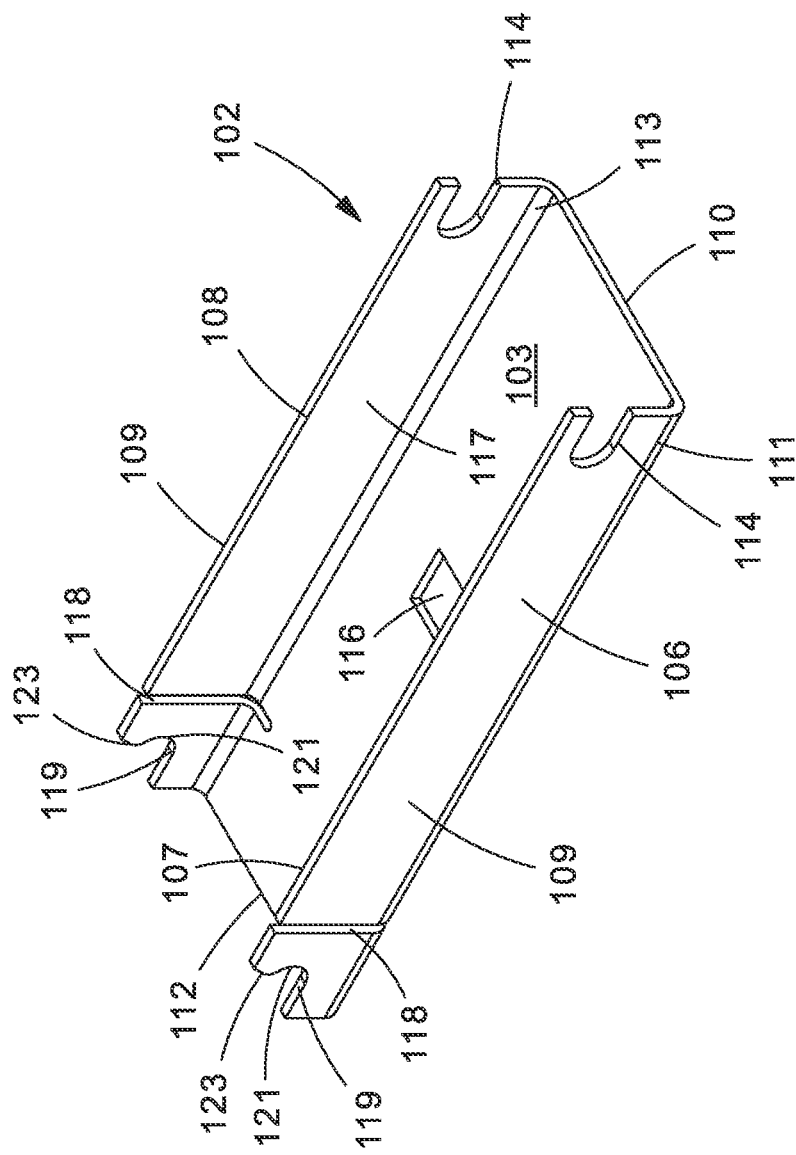
FIG. 1 is a top perspective view of a clamp bottom of an example wire basket bracket of the present invention.

While this invention is susceptible of embodiments in many different forms, there is shown in the drawings and will herein be described in detail, embodiments of the invention with the understanding that the present disclosure is to be considered as an exemplification of the principles of the invention and is not intended to limit the broad aspect of the invention to the embodiments illustrated.

The disclosed wire basket bracket enables a cable cleat assembly to be safely and securely mounted to a wire basket with minimal tools and can accommodate a variety of cable attachment products. Further, the wire basket bracket may be connected to a cable cleat and used with power cable installations where high voltage cable installations are implemented. The combination of the wire basket and a cable cleat assembly holds the cables in place during a short-circuit event to prevent damage to people and property.

Turning to the figures, FIG. 1 depicts an example of a clamp bottom 102 of one example of a wire basket bracket. The clamp bottom 102 is shaped as a U-shaped configuration. The clamp bottom 102 includes a base 103 that is planar and rectangularly shaped. A first sidewall 106 resides along a longitudinal edge 111 of the base 103 and a second sidewall 108 resides along the other longitudinal edge 113 of the base 103. The first sidewall 106 and second sidewall 108 are planar and extend from the base 103 at a right angle and include an interior side 107 and an exterior side 109.

The clamp bottom 102 has a first end 110 and a second end 112. The first end 110 of the clamp bottom 102 includes a wire basket slot 114 in each of the first sidewall 106 and second sidewall 108. The wire basket slots 114 are configured as a U-shaped cutout within the first sidewall 106 and second sidewall 108. The wire basket slots 114 are configured to accept a cross-wire of a wire basket. A through hole 116 resides in the base 103 at approximately the middle of the base 103. The through hole 116 maybe a rectangular opening as depicted or may also be circular. The through hole 116 is configured to accept a carriage bolt to extend therethrough.

The clamp bottom 102 includes latch reliefs 118 near the second end 112 of the clamp bottom 102. Latch relief 118 resides within each of the first sidewall 106 and second sidewall 108 and extends at least a portion into the base 103. The latch reliefs 118 are slots disposed within the sidewalls 106, 108 and a portion of the base 103. The latch reliefs 118 are configured to allow for the second end 112 of the clamp bottom 102 to deflect and deform at the latch reliefs 118 during installation.

Adjacent the latch reliefs 118 are latch slots 119 in each of the first sidewall 106 and second sidewall 108 at the second end 112 of the clamp bottom 102. The latch slots 119 are configured as J-shaped cutouts within the first sidewall 106 and second sidewall 108. Each of the latch slots 119 in the first sidewall 106 and second sidewall 108 include a hook 121 with an end portion 123. The hook 121 is configured to engage a cross-wire of a wire basket.

Figure 2:
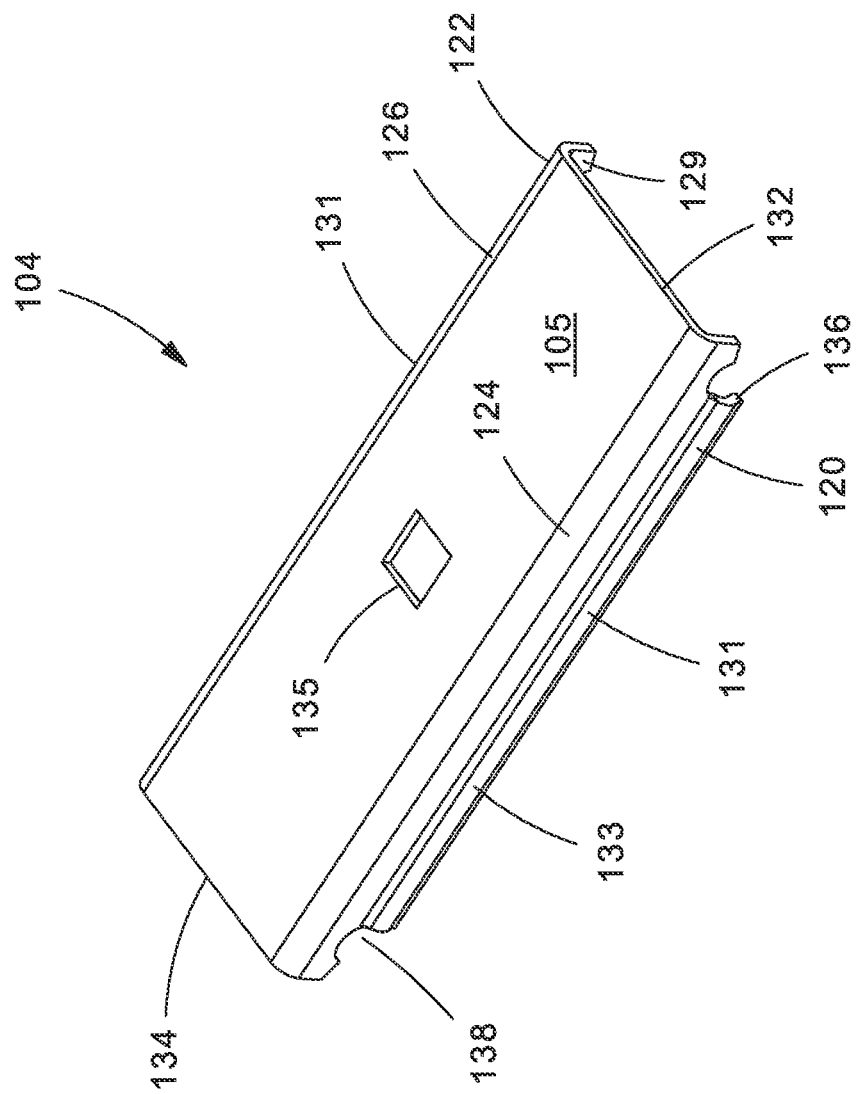
FIG. 2 is a top perspective view of a clamp top of the example wire basket bracket of the present invention.

FIG. 2 depicts a clamp top 104 of the wire basket bracket 100. The clamp top 104 is shaped as a U-shaped configuration similar to the clamp bottom 102, with a first end 132 and a second end 134. The clamp top 104 includes a base 105 that is planar and rectangularly shaped. A first sidewall 120 resides along a longitudinal edge 124 of the base 105 and a second sidewall 122 resides along the other longitudinal edge 126 of the base 105 of the clamp top 104. The first sidewall 120 and second sidewall 122 extend from the base 105 at a right angle and include an interior side 129 and an exterior side 131. Each of the first sidewall 120 and the second sidewall 122 each include an interference bead 133 along the exterior side 131. The interference beads 133 are located on each of the first sidewall 120 and second sidewall 122 along a longitudinal axis at approximately a center of the respective sidewalls 120, 122. The interference beads 133 are formed as a rib in the sidewalls 120, 122 and protrudes out from the exterior side 131 from a planar portion of the sidewalls 120, 122.

Each of the first sidewall 120 and second sidewall 122 includes a cross-wire notch 136, 138 at each of the first end 132 and second end 134. The first cross-wire notch 136 is roughly C-shaped. The first cross-wire notch 136 is configured to engage with a cross-wire of a wire basket. The second cross-wire notch 138 is also roughly C-shaped, just as the first cross-wire notch 136. The second cross-wire notch 138 is configured to engage with another cross-wire of a wire basket.

A through hole 135 resides in the base 105 at approximately the middle of the base 105 of the clamp top 104. The through hole 135 maybe a rectangular opening as depicted or may also be circular. The through hole 135 is configured to accept a carriage bolt to extend therethrough.

Figure 3:
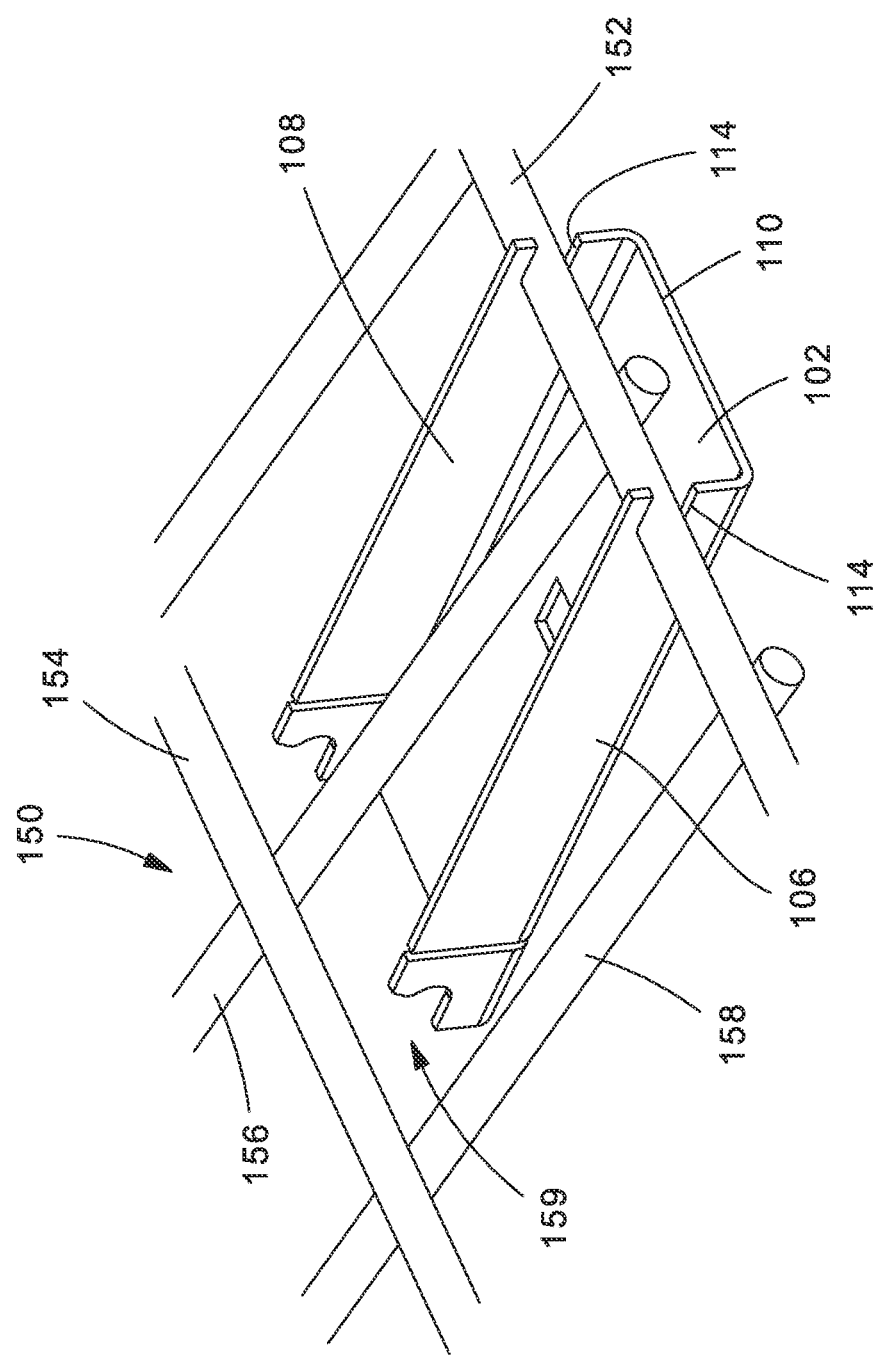
FIG. 3 is a top perspective view of the clamp bottom of FIG. 1, partially engaged with a wire basket.

FIG. 3 depicts the clamp bottom 102 in an initial installation position with a wire basket 150. The wire basket 150 generally includes cross-wires, or crossmembers, with a first plurality of cross-wires disposed parallel to each other and a second plurality of cross-wires disposed parallel to each other, but perpendicular to the first plurality. This configuration creates a grid of cross-wires. As depicted, a first cross-wire 152 and second cross-wire 154 are parallel to each other, but perpendicular to a third cross-wire 156 and fourth cross-wire 158, that are parallel to each other. The grid connection typically forms a rectangular opening 159 between the cross-wires 152, 154, 156, & 158. In the initial installation position, a first cross-wire 152 of the wire basket 150 resides within the wire basket slots 114 of the first sidewall 106 and second sidewall 108 of the clamp bottom 102. The first end 110 of the clamp bottom 102 is supported by the first cross-wire 152 of the wire basket 150.

Figure 4:
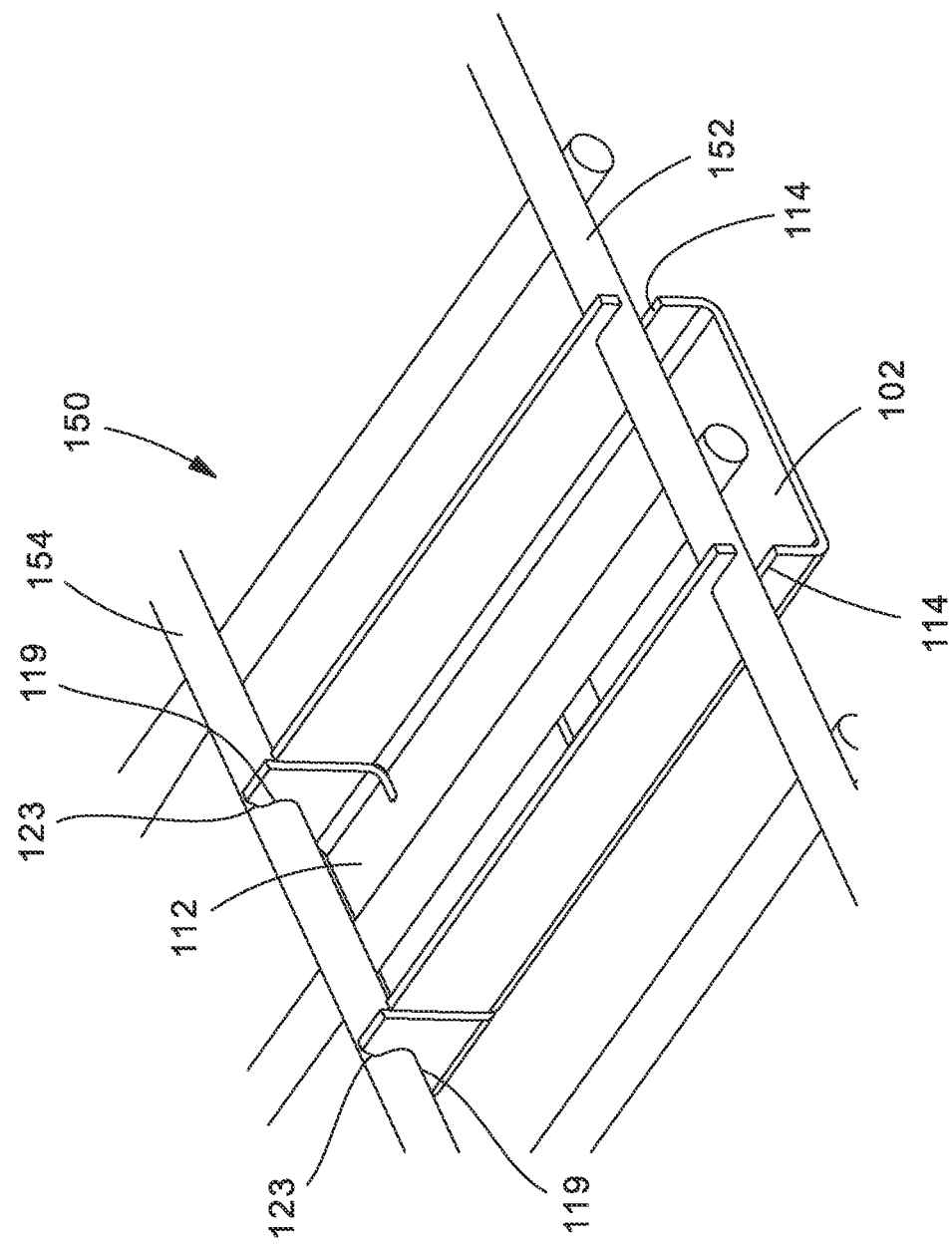
FIG. 4 is a top perspective view of the clamp bottom of FIG. 1, fully engaged with the wire basket.

FIG. 4 depicts the clamp bottom 102 in a second installation position. In the second installation position, the latch slots 119 at the second end 112 of the clamp bottom 102 are engaged with the second cross-wire 154 of the wire basket 150. The second end 112 of the clamp bottom 102 is supported by the second cross-wire 154 of the wire basket 150.

To orient the clamp bottom 102 from the first position to the second position as depicted in FIG. 4, the clamp bottom 102 is pivoted up about the engagement of the wire basket slots 114 and first cross-wire 152. As the clamp bottom 102 is pivoted up, the end 123 of the latch slots 119 of the first sidewall 106 and second sidewall 108 contact the second cross-wire 154. As the clamp bottom 102 is further pivoted up, the latch slots 119 deflect inward in a direction of the first end 112 via the latch reliefs 118. The latch slots 119 and second end 112 defect inwards until the end portion 123 of the hook 121 clears the second cross-wire 154. When the second cross-wire 154 has cleared the end portion 123 of the hook 121, the latch slots 119 are engaged with the second cross-wire 154. The clamp bottom 102 is now attached to the wire basket 150.

Figure 5:
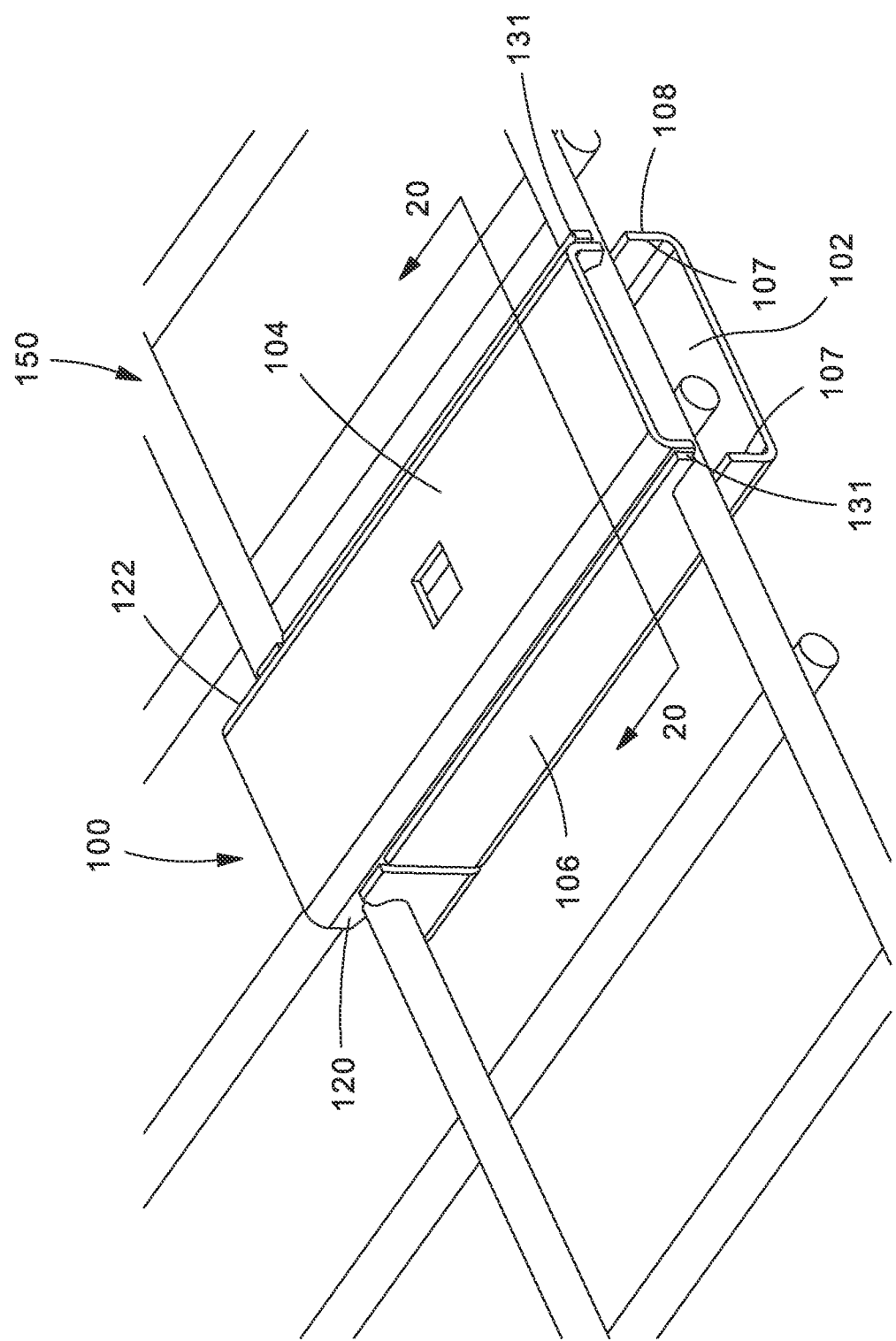
FIG. 5 is a perspective view of the wire basket bracket of the present invention including the clamp bottom of FIG. 4 with the clamp top of FIG. 2 installed thereon.
Figure 6:
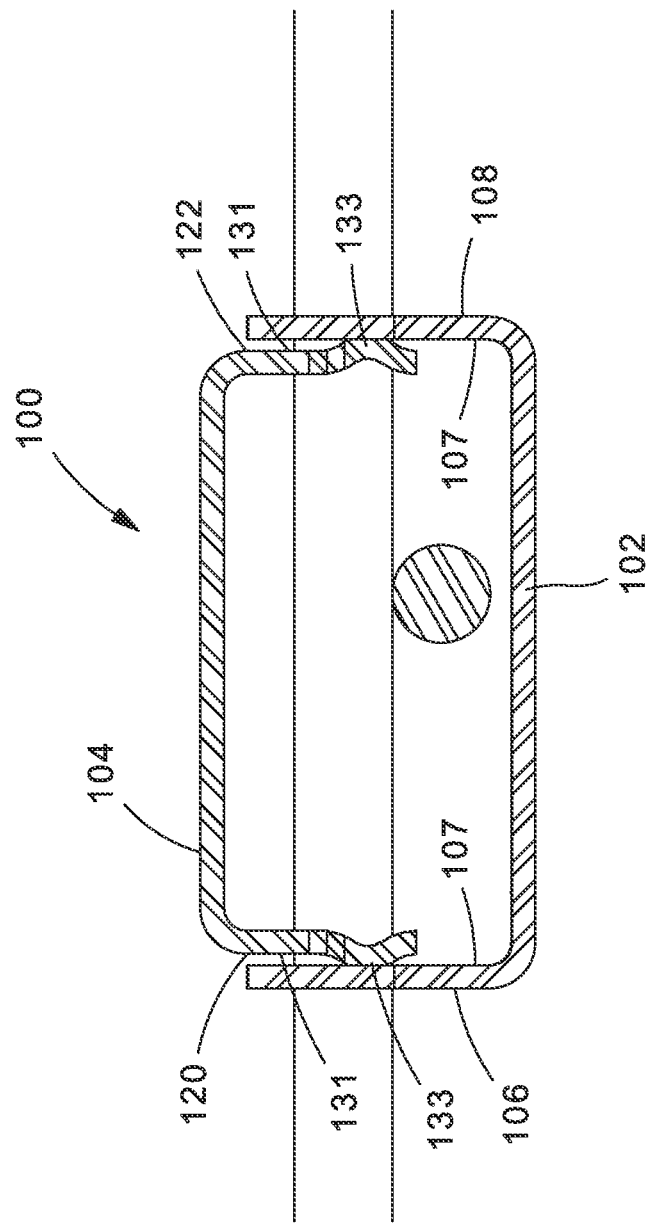
FIG. 6 is cross-section view of the wire basket bracket of FIG. 5 taken along cross-section line 20.

FIGS. 5 and 6 depict the clamp bottom 102 and clamp top 104 mated and installed to the wire basket 150. The clamp bottom 102 and clamp top 104 are configured to mate in a clam shell fashion, to form the wire basket bracket 100. The clamp top 104 resides within the clamp bottom 102. That is, the exterior side 131 of the sidewalls 120, 122 of the clamp top 104 are disposed between the interior side 107 of the sidewalls 106, 108 of the clamp bottom 102. The distance between the exterior side 131 of the first sidewall 120 and the exterior side 131 of the second sidewall 122 of the clamp top 104 is configured to be less than the distance between the interior side 107 of the first sidewall 106 and the interior side 107 of the second sidewall 108 of the clamp bottom 102 to allow for the clamp top 104 to mate between the sidewalls 106, 108 of the clamp bottom 102. The distance between the interference beads 133 (FIG. 6) of the first sidewall 120 and second sidewall 122 of the clamp top are configured to be slightly larger than the distance between interior side 107 of the sidewalls 106, 108 of the clamp bottom 102. When the clamp top 104 is in the mated configuration with the clamp bottom 102, the first sidewall 120 and second sidewall 122 of the clamp top 104 are deflected inwards by the interior sides 107 first sidewall 106 and second sidewall 108 of the clamp bottom 102. The clamp top 104 is held together to the clamp bottom 102 in compression.

As depicted in FIG. 5, the first cross-wire notch 136 and second cross-wire notch 138 of the clamp top 104 are engaged with the first cross-wire 152 and second cross-wire 154, respectively, of the wire basket 150. The clamp top 104 is thereby aligned with the clamp bottom 102, as are the through hole 116 of the clamp bottom 102 and the through hole 135 of the clamp top 104.

Figure 7:
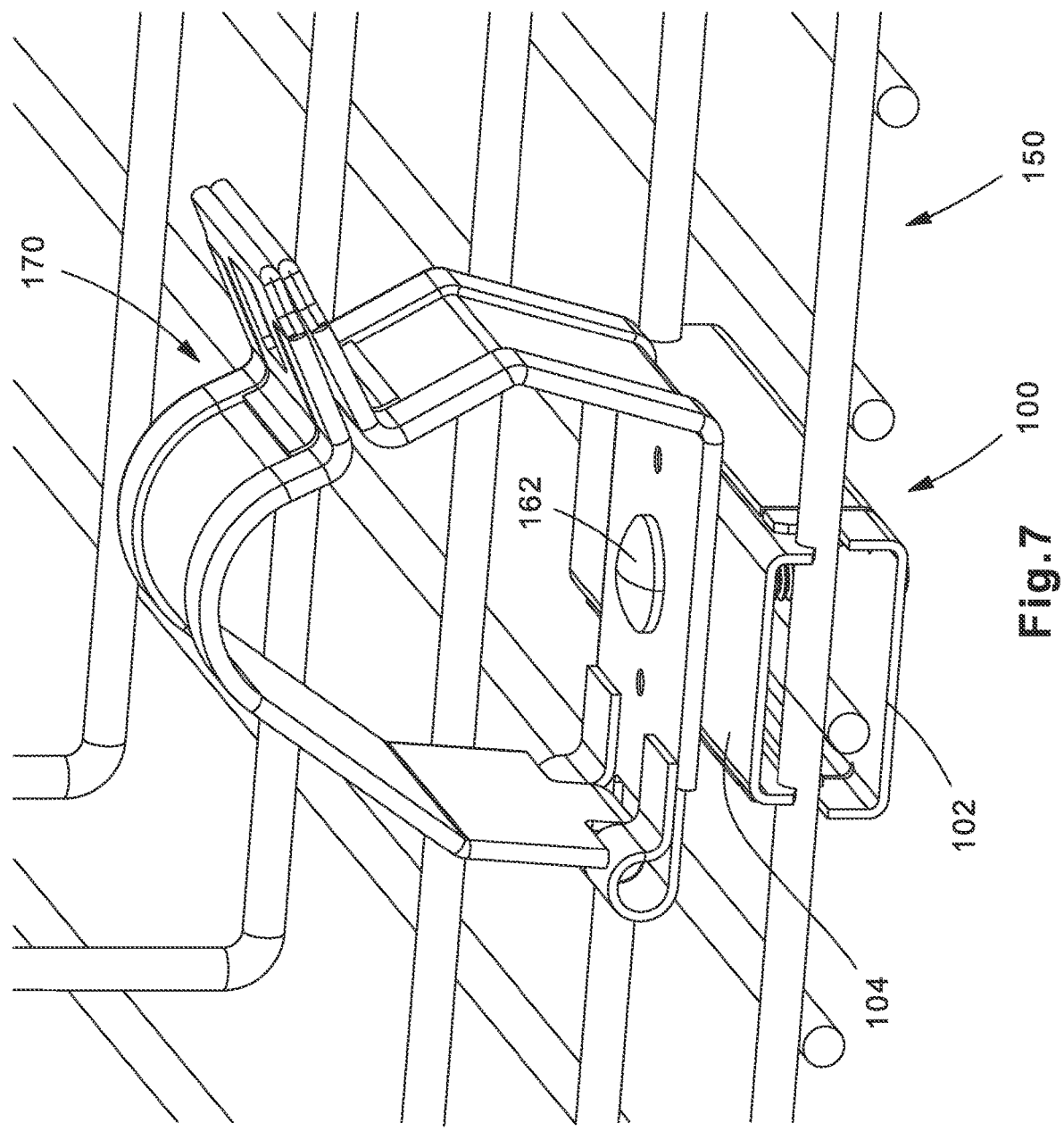
FIG. 7 is a perspective view of the wire basket bracket of FIG. 5 with an example cable cleat assembly attached thereto.

FIG. 7 depicts an example cable cleat assembly 170 connected to the wire basket bracket 100 that is, in turn, connected to a wire basket 150. The cable cleat assembly 170 being the cable cleat assembly 170 disclosed in FIGS. 4-9 of U.S. patent application Ser. No. 16/252,962. In this example, the cable cleat assembly 170 is fastened to the wire basket bracket 100 through a carriage bolt 162. Any other acceptable fastener may also be used. The threaded shaft of the carriage bolt 162 extends from the head of the carriage bolt 162 through the through hole 135 (not seen) of the clamp top 104 and through the through hole 116 (not seen) of the clamp bottom 102. A nut (not depicted) is then fastened to the end of the threaded shaft of the carriage bolt 162.

Figure 8:
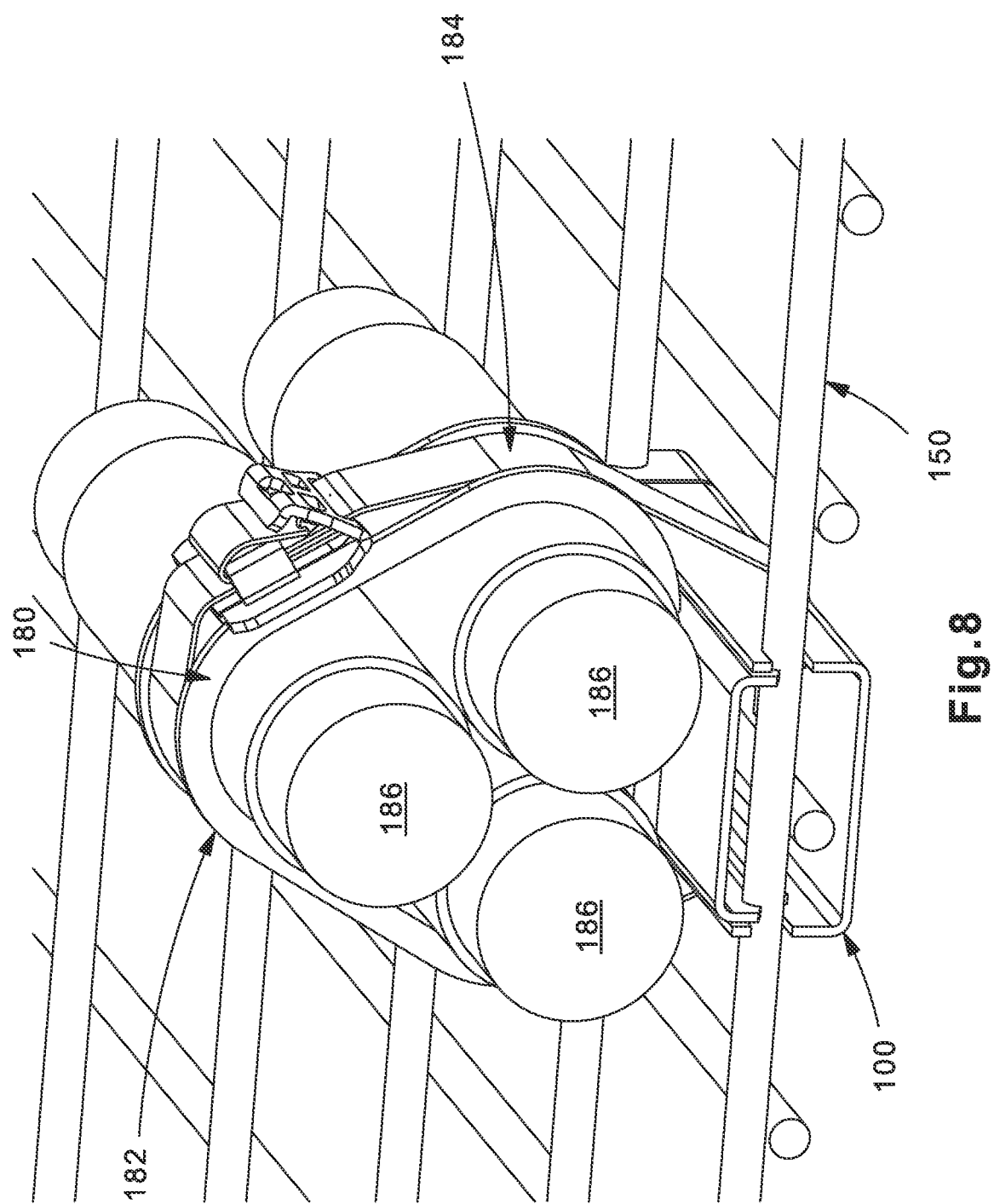
FIG. 8 is a perspective view of the wire basket bracket of FIG. 5 with a second example cable cleat assembly attached thereto.

FIG. 8 depicts another example of a cable management assembly 180 including a cushion sleeve 182 and strap cleat 184. The cushion sleeve 182 and strap cleat 184 are connected to the wire basket bracket 100 that is in turn connected to a wire basket 150. In this example, the cushion sleeve 182 rests on the wire basket bracket 100. Three power cables 186 reside within the cushion sleeve 182. The strap cleat 184 extends around the cushion sleeve 182 and the wire basket bracket 100 to secure both the power cables 186 installed within cushion sleeve 182 and wire basket bracket 100 to the wire basket 150.

Figure 9:
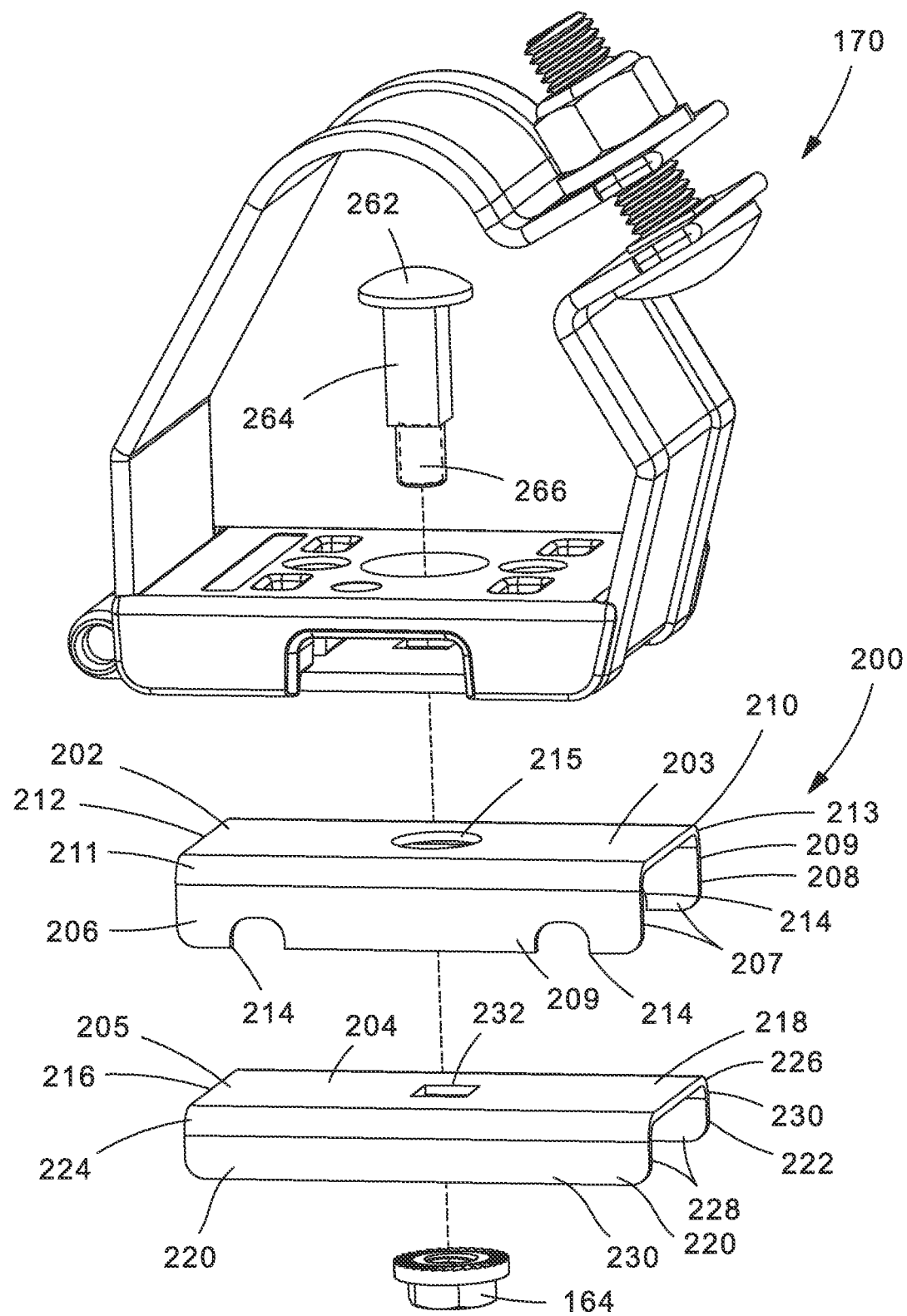
FIG. 9 is an exploded perspective of another example of the wire basket bracket of the present invention and an example cable cleat assembly.

FIGS. 9-15 depict an alternative example wire basket bracket 200 of the present invention. FIG. 9 is an exploded perspective view of a wire basket bracket 200 and the cable cleat assembly 170 described above in FIG. 7. As depicted in FIG. 9, the wire basket bracket 200 includes a bracket frame 202 and a locking plate 204. The bracket frame 202 is shaped as a U-shaped configuration, with a first end 210 and a second end 212. The bracket frame 202 includes a base 203 that is planar and rectangularly shaped. A first sidewall 206 resides along a first longitudinal edge 211 of the base 203 and a second sidewall 208 resides along a second longitudinal edge 213 of the base 203. The first sidewall 206 and second sidewall 208 are planar and disposed from the base 203 at a right angle. The first sidewall 206 and second sidewall 208 each include an interior side 207 and an exterior side 209.

The bracket frame 202 includes two cross-wire notches 214 in each of the first sidewall 206 and second sidewall 208. The cross-wire notches 214 are configured as a U-shaped cutout within the first sidewall 206 and second sidewall 208. The cross-wire notches 214 are configured to accept a cross-wire of a wire basket. The two cross-wire notches 214 in each of the sidewalls 206, 208 include one cross-wire notch 214 adjacent the first end 210 and one cross-wire notch 214 adjacent the second end 212. The cross-wire notches 214 on the first side wall 206 and second sidewall 208 are spaced from each other at a distance configured to engage two adjacent and parallel wire basket cross-wires.

A through hole 215 resides in the base 203 at approximately the middle of the base 203. The through hole 215 maybe a circular opening as depicted. The through hole 215 is configured to accept a carriage bolt 262 to extend therethrough.

Also depicted in FIG. 9, the locking plate 204 is shaped as a U-shaped configuration. The locking plate 204 includes a base 205 that is planar and rectangularly shaped. The locking plate 204 has a first end 216 and a second end 218. The distance from the first end 216 to the second end 218 of the locking plate 204 is approximately the same as the distance from the first end 210 and second end 212 of the bracket frame 202. Each of the bracket fame 202 and the locking plate 204 are configured to span a distance greater than a pair of adjacent cross-wires. A first sidewall 220 resides along a first longitudinal edge 224 of the base 205 and a second sidewall 222 resides along the second longitudinal edge 226 of the base 205. As depicted, the longitudinal edges 224, 226 are radiused edges that extend between the base 205 and the sidewalls 220, 222. The first sidewall 220 and second sidewall 222 are planar and disposed from the base 205 at a right angle. The first sidewall 220 and second sidewall 222 each include an interior side 228 and an exterior side 230.

A through hole 232 resides in the base 205 of the locking plate 204 at approximately the middle of the base 205. The through hole 232 is rectangularly shaped and is configured to accept a square shoulder 264 of the carriage bolt 262. The square shoulder 264 is configured to fit within the square through hole 232 of the locking plate 204. The end of the carriage bolt 262 includes a threaded shaft 266 for a nut 164 to attach thereto. In this configuration, rotation of the cable cleat assembly 170 rotates the locking plate 204 through the rotation of the carriage bolt 262 being acted on by the cable cleat assembly 170, and the carriage bolt 262 acting on the locking plate 204.

Figure 10:
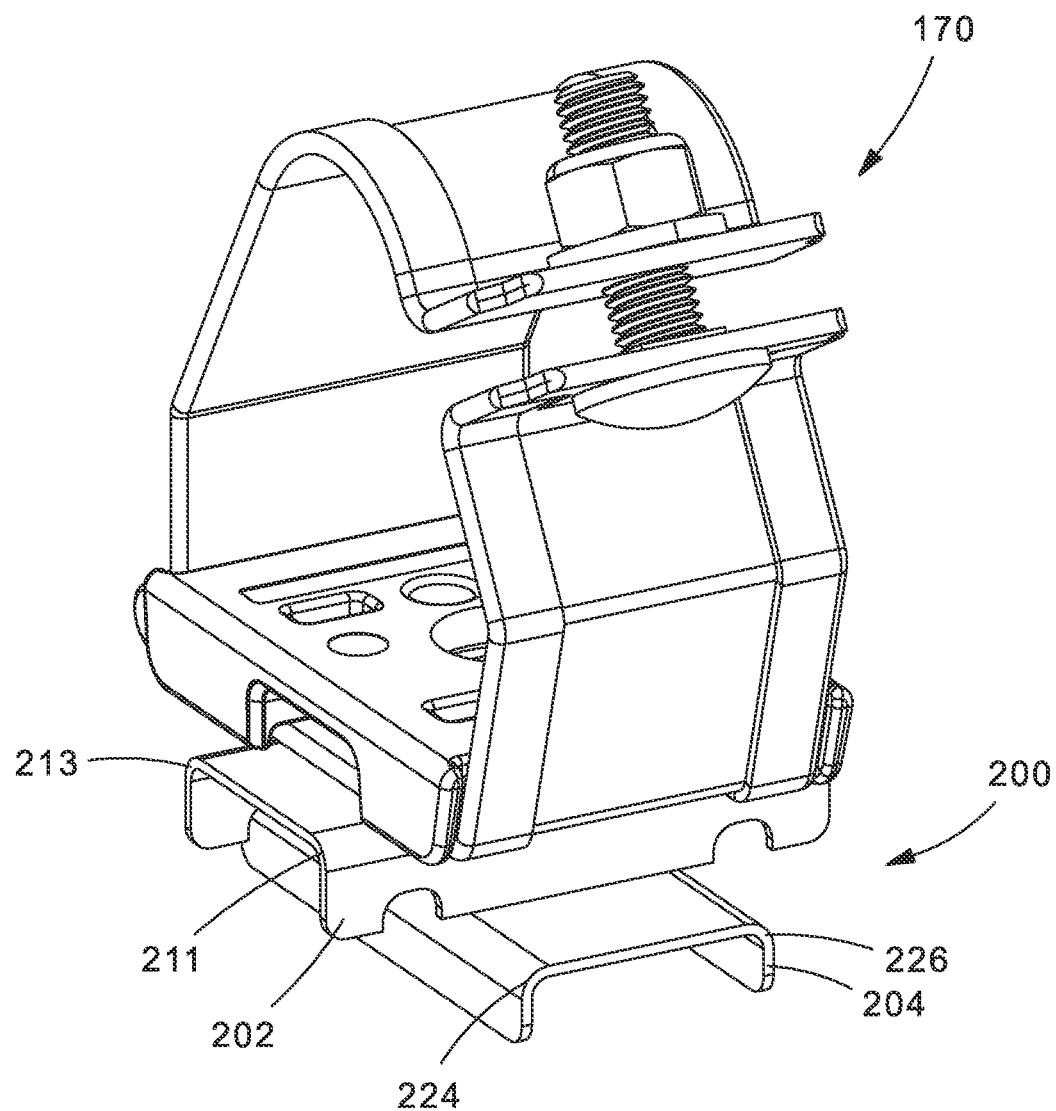
FIG. 10 is an assembled perspective view of the wire basket bracket and cable cleat assembly of FIG. 9.
Figure 11:
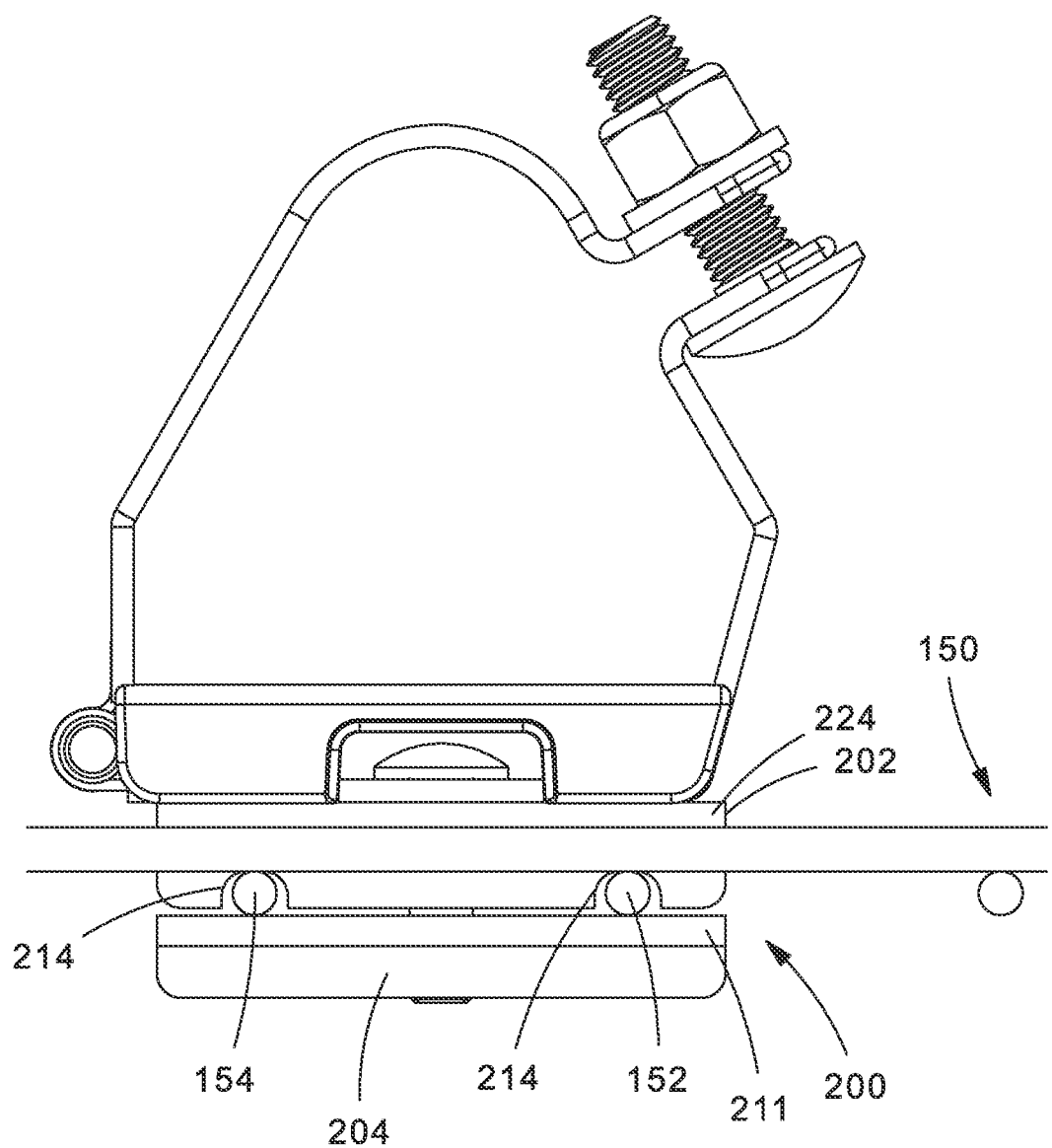
FIG. 11 is a side view of the wire basket bracket and cable cleat assembly of FIG. 9.

FIG. 10 depicts a perspective view of an assembled wire basket bracket 200 and cable cleat assembly 170. The bracket frame 202 is attached to the locking plate 204 via the carriage bolt 162 (not seen). In this configuration, the longitudinal edges 211, 213 of the bracket frame 202 are disposed approximately 90-degrees from the longitudinal edges 224, 226 of the locking plate 204. FIG. 11 depicts a side view of the assembled wire basket bracket 200. The longitudinal edges 211, 213 of the bracket frame 202 are parallel with the longitudinal edges 224, 226 of the locking plate 204. The cross-wire notches 214 are engaged with a first cross-wire 152 and second cross-wire 154 of a wire basket 150. In this configuration, the first cross-wire 152 and second cross-wire 154 are locked between the bracket frame 202 and the locking plate 204. The wire basket bracket 200 is secured in place with the bracket frame 202 and locking plate 204 in this configuration.

Figure 12:
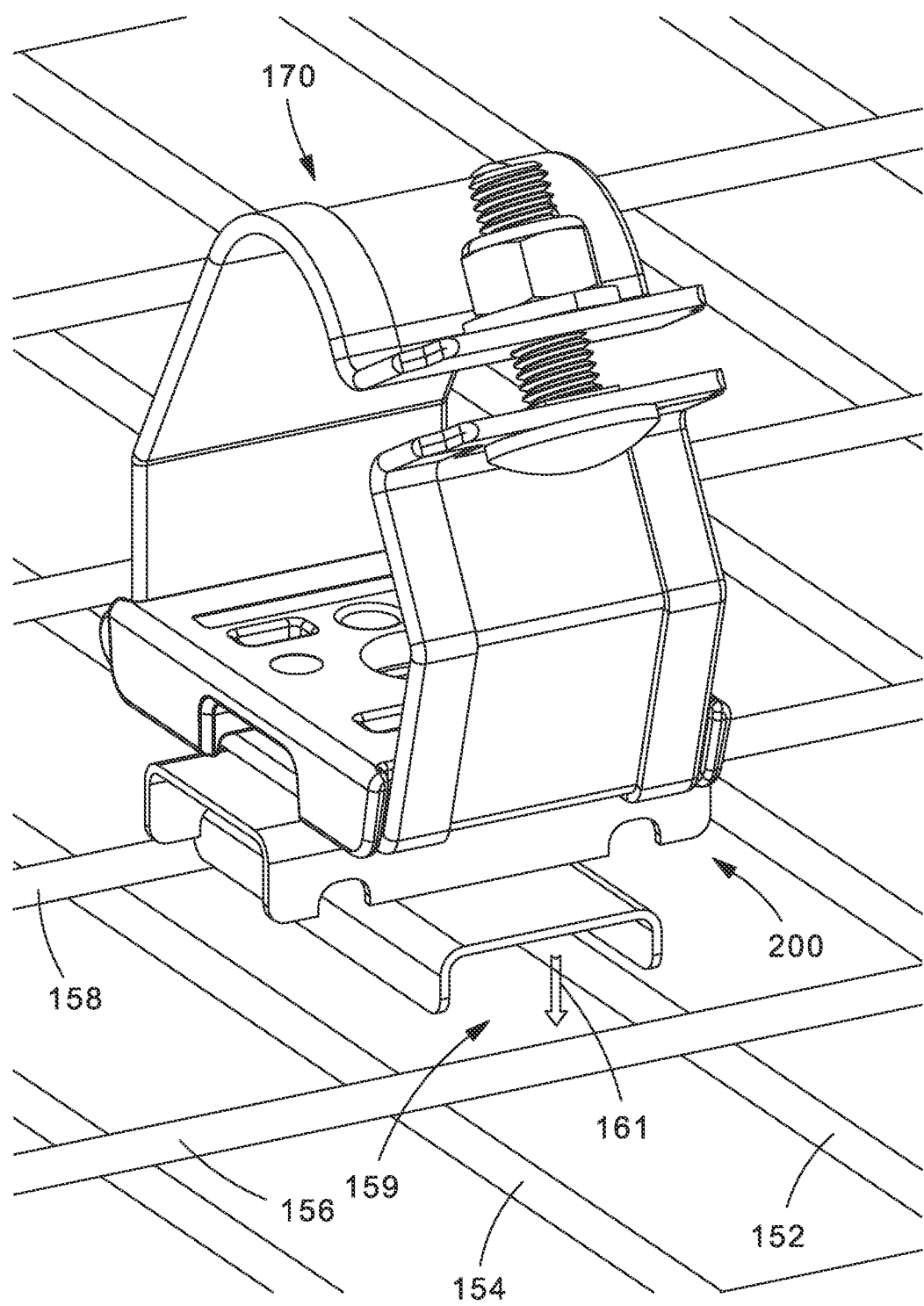
FIG. 12 is a perspective view of the wire basket bracket of FIG. 9 and cable cleat assembly in an initial installation position with a wire basket.

FIG. 12 depicts the assembled wire basket bracket 200 and cable cleat assembly 170 in an initial installation position. In the initial installation position, the assembled wire basket bracket 200 and cable cleat assembly 170 are positioned above first cross-wire 152, second cross-wire 154, a third cross-wire 156, and fourth cross-wire 158 of the wire basket 150. The longitudinal axis of the cable cleat assembly 170 and the locking plate 204 are aligned, and the longitudinal axis of bracket frame 202 is disposed 90-degrees relative to the cable cleat assembly 170 and the locking plate 204. An arrow 161 indicates the movement of the wire basket bracket into the opening 159 of the wire basket 150 towards a second installation position.

Figure 13:
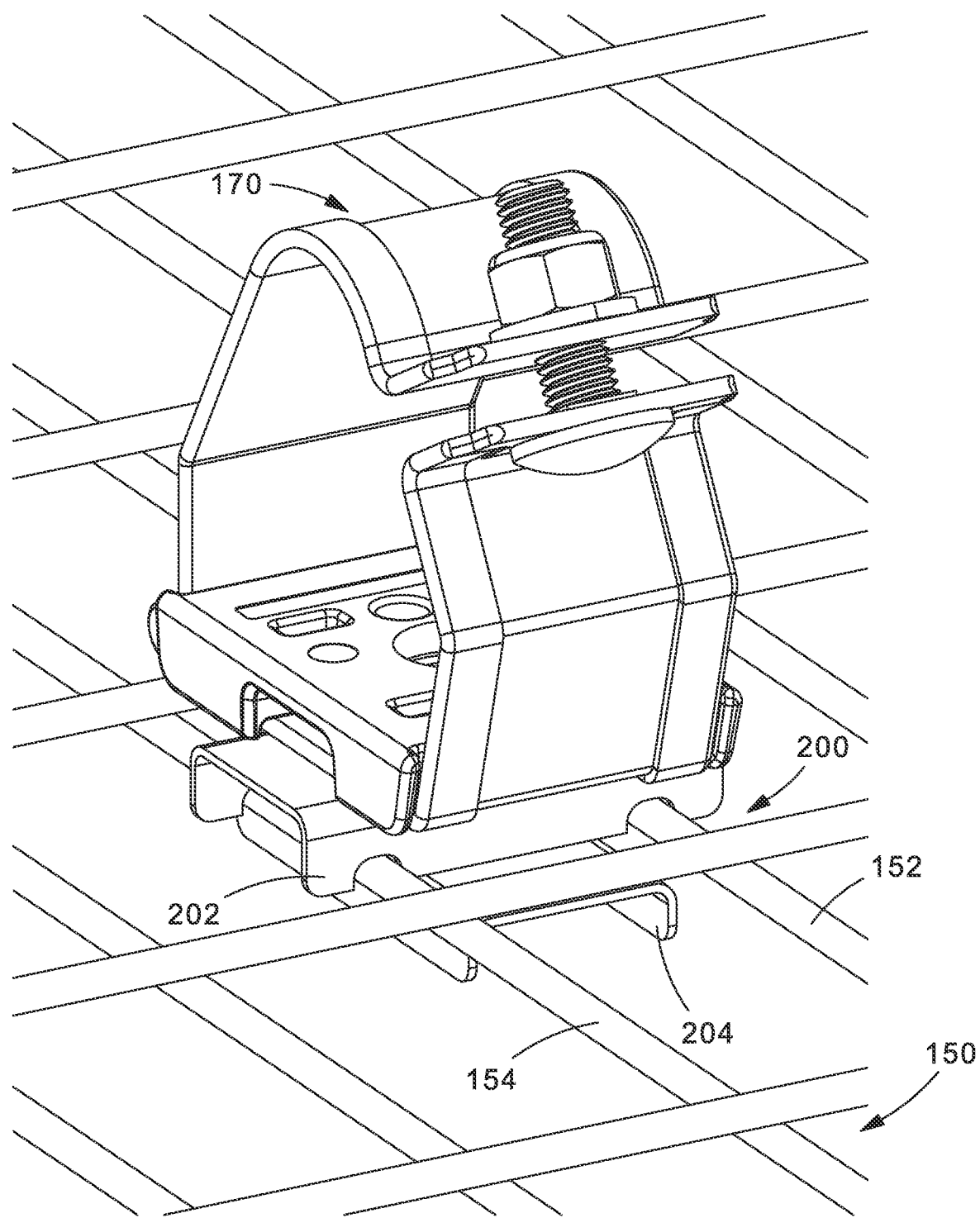
FIG. 13 is a perspective view of the wire basket bracket of FIG. 9 and cable cleat assembly in a second installation position with the wire basket.

FIG. 13 depicts the second installation position of the wire basket bracket 200 and cable cleat assembly 170. In the second installation position, the longitudinal axis of the cable cleat assembly 170 and the locking plate 204 are aligned, and the longitudinal axis of bracket frame 202 is disposed 90-degrees relative to the cable cleat assembly 170 and the locking plate 204. The cross-wire notches are engaged with a first cross-wire 152 and second cross-wire 154 of a wire basket 150. The wire basket bracket 200 and cable cleat assembly 170 are supported by the first cross-wire 152 and second cross-wire 154.

Figure 14:
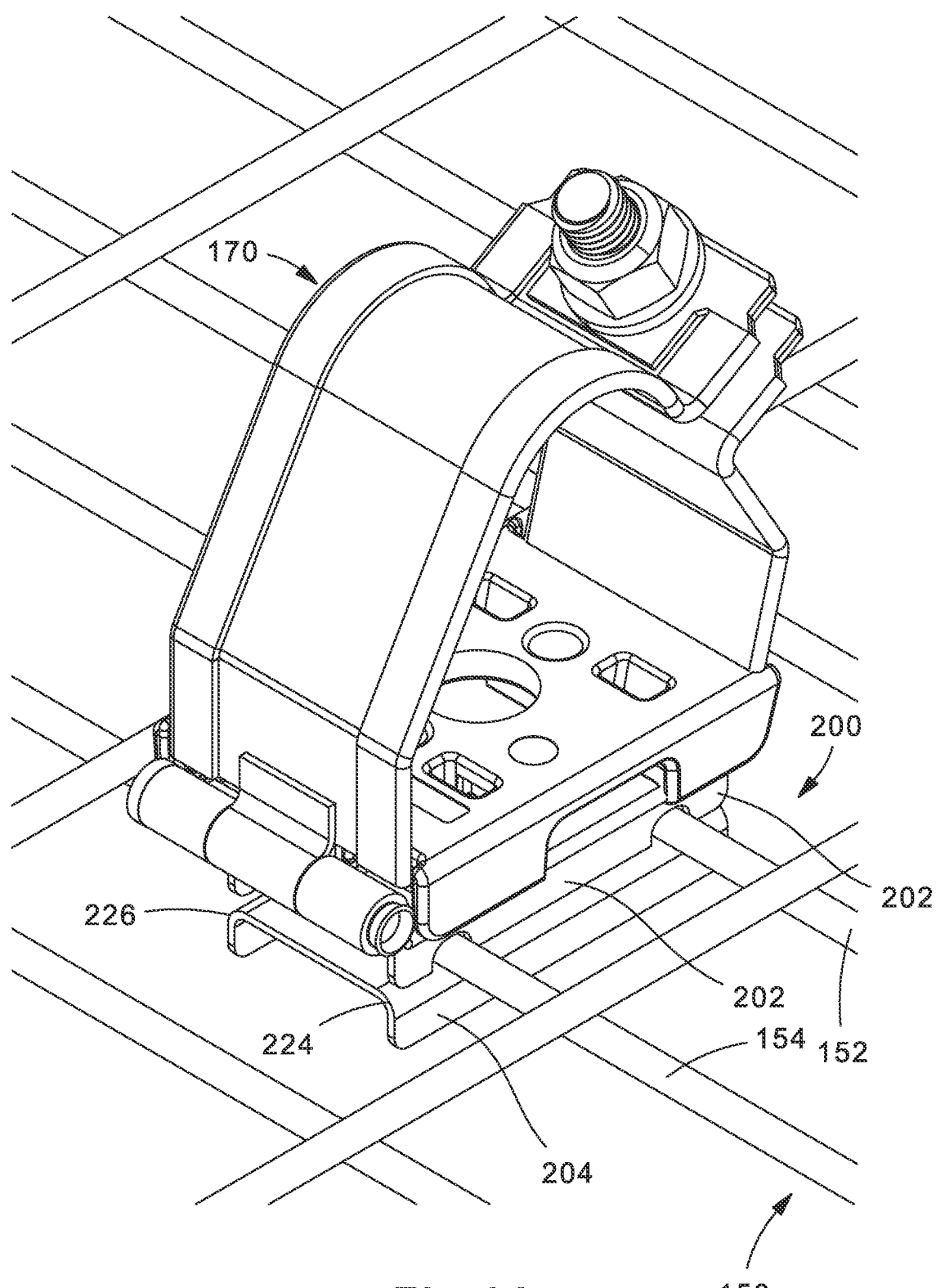
FIG. 14 is a perspective view of the wire basket bracket of FIG. 9 and cable cleat assembly in a final installation position with the wire basket.
Figure 15:
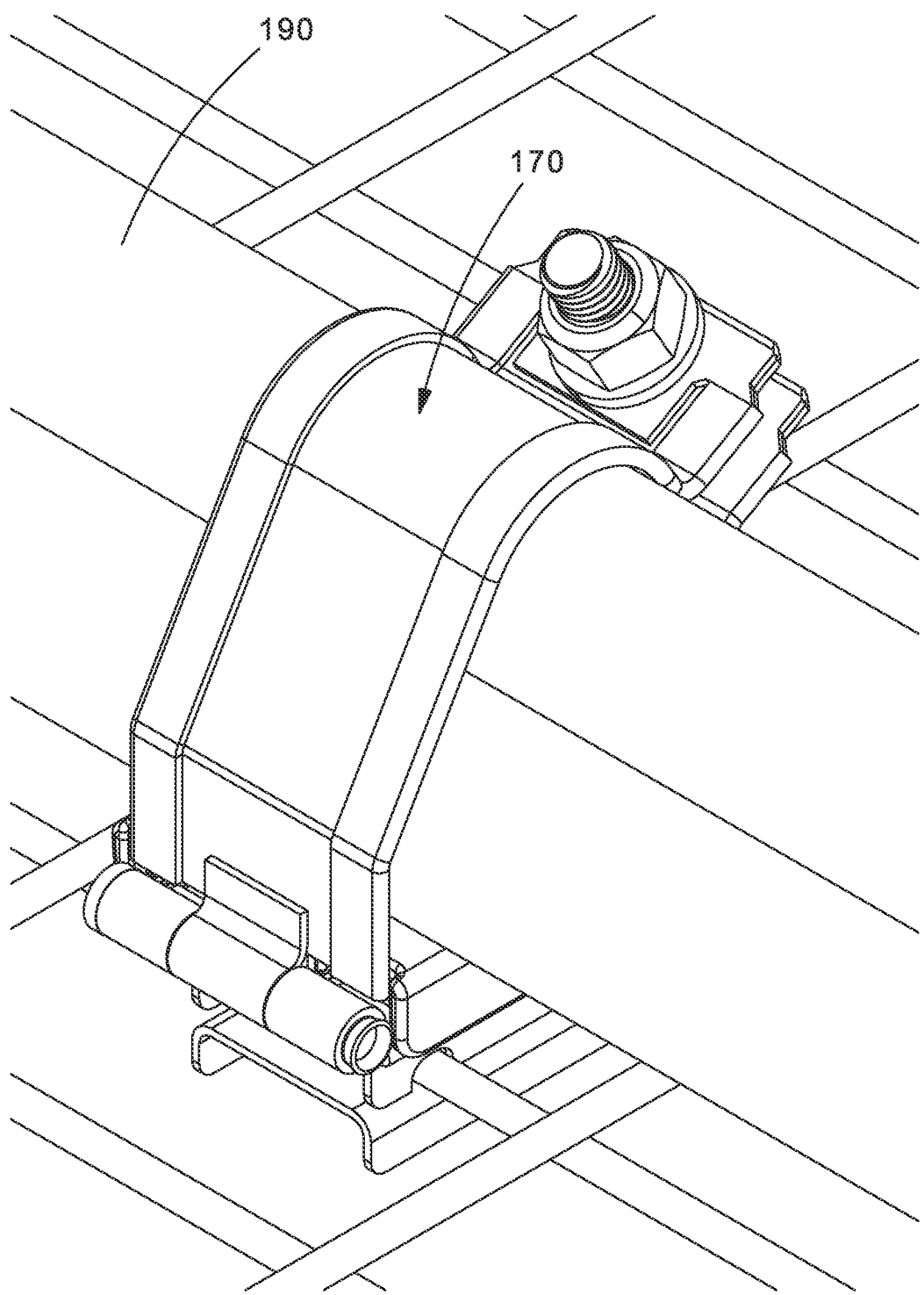
FIG. 15 is a perspective view of the wire basket bracket and cable cleat assembly of FIG. 14 with power cables installed therein.

FIG. 14 depicts an installed position of the wire basket bracket 200 and cable cleat assembly 170. In the installed position, the longitudinal edges 211, 213 of the bracket frame 202 are parallel with the longitudinal edges 224, 226 of the locking plate 204. The cross-wire notches 214 are engaged with a first cross-wire 152 and second cross-wire 154 of a wire basket 150. In this configuration, the first cross-wire 152 and second cross-wire 154 are locked between the bracket frame 202 and the locking plate 204. The wire basket bracket 200 is secured in place with the bracket frame 202 and locking plate 204 in this configuration. FIG. 15 depicts the wire basket bracket 200 and cable cleat assembly 170 of FIG. 14 with three power cables 190 (two visible, one hidden from view) installed within.

Figure 16:
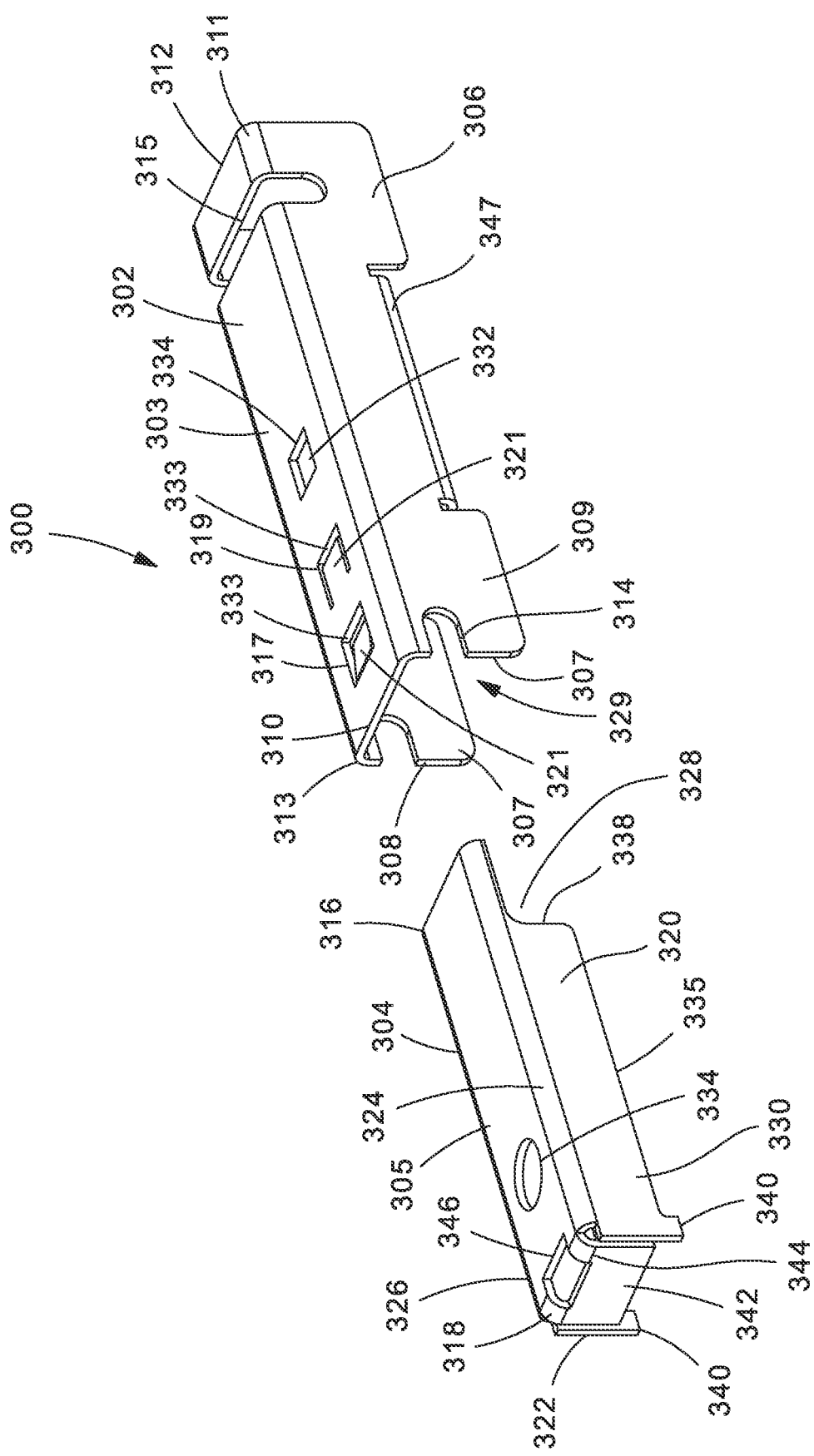
FIG. 16 is a top perspective view of another example wire basket bracket of the present invention including a locking slide and a bracket frame.

FIGS. 16-22 depict a further example wire basket bracket 300 of the present invention. FIG. 16 is an exploded perspective of the wire basket bracket 300, including a bracket frame 302 and a locking slide 304. The bracket frame 302 is generally shaped in a U-shaped configuration including an interior 329 within. The bracket frame 302 includes a first end 310 and a second end 312. The bracket frame 302 includes a base 303 that is planar and rectangularly shaped. Adjacent the first end 310 of the bracket frame 302 within the base 303 are a series of detents 317, 319. A first detent 317 is directly adjacent the first end 310 and a second detent 319 is adjacent the first detent 317. Each of the detents 317, 319 include a detent tab 321 that resides within an opening 333 in the base. The detent tab 321 of the first detent 317 is angled downward such that the detent tab 321 projects into the interior 329 of the bracket frame 302. The detent tab 321 of the second detent 319 is planar with the base 303. A through hole 332 resides in the base 303 of the bracket frame 302 at approximately the middle of the base 303. The through hole 332 is configured to accept a carriage bolt to mount a cable cleat assembly to the wire basket bracket 300.

The bracket frame 302 further includes a first sidewall 306 residing along a first longitudinal edge 311 of the base 303 and a second sidewall 308 residing along the second longitudinal edge 313 of the base 303. The first sidewall 306 and second sidewall 308 are planar and disposed from the base 303 at a right angle. The first sidewall 306 and second sidewall 308 each include an interior side 307 and an exterior side 309.

Each of the first sidewall 306 and second sidewall 308 each include a retaining flange 347. The retaining flange 347 resides near the bottom of each of the first sidewall 306 and second sidewall 308. The retaining flange 347 being further described below in connection with FIG. 17.

The first end 310 of the bracket frame 302 includes a wire basket slot 314 in each of the first sidewall 306 and second sidewall 308. The wire basket slots 314 are configured as U-shaped cutouts within the first sidewall 306 and second sidewall 308. The wire basket slots 314 are configured to accept a cross-wire of a wire basket. Adjacent a second end 312 of the bracket frame 302 is a slot 315. The slot 315 forms an opening in the base 303; longitudinal edges 311, 313; and sidewalls 306, 308. The slot 315 is configured to accept a cross-wire of a wire basket.

As indicated above, FIG. 16 further depicts the locking slide 304. The locking slide 304 includes a first end 316 and a second end 318. The locking slide 304 includes a base 305 that is planar and rectangularly shaped. A through hole 334 resides in the base 305 adjacent the second end 318 of the base 305. The through hole 334 maybe a circular opening as depicted. The through hole 334 is configured to accept a carriage bolt 262 to extend therethrough.

A first sidewall 320 resides along a portion of a first longitudinal edge 324 of the base 305 and a second sidewall 322 resides along the second longitudinal edge 326 of the base 305. The first sidewall 320 and second sidewall 322 are planar and disposed from the base 305 at a right angle. The first sidewall 320 and second sidewall 322 each include an interior side 328 and an exterior side 330. The first sidewall 320 and second sidewall 322 each include a leading edge 338. The leading edge 338 is inset from the first end 316 and extends from the respective longitudinal edges 324, 326 to a bottom 335 of the sidewalls 320, 322.

Located at a second end 318 of the locking slide 304 on each of the first sidewall 320 and second sidewall 322 is a stop 340. The stop 340 is a rectangular extension from the bottom 135 of each of the sidewalls 320, 322.

FIG. 16 further depicts a backwall 342 of the locking slide 304. The backwall 342 extends from a back edge 344 of the base 305. The backwall 342 extends from the base 305 at a right angle. A portion of a detent catch 346 located within the back edge 344 and a portion is located within the base 305. The detent catch 346 is an opening in the back edge 344 and base 305 that is configured to accept the detent tab 321 of first detent 317 or second detent 319.

Figure 17:
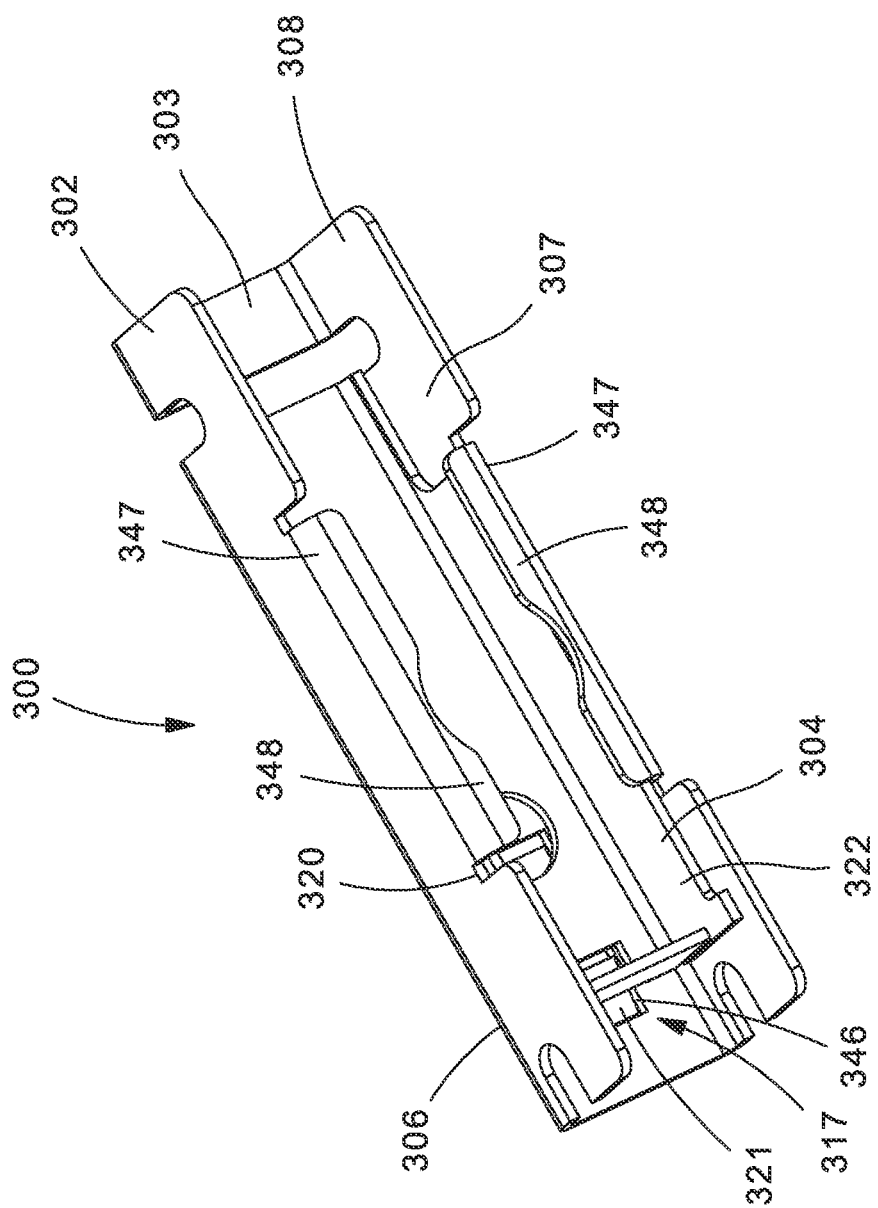
FIG. 17 is a bottom perspective view of an assembled wire basket bracket of FIG. 16.

FIG. 17 depicts the wire basket bracket 300 with the bracket frame 302 mated with the locking slide 304 in a first mated position. The locking slide 304 resides within the bracket frame 302. That is, the exterior side 331 of the sidewalls 320, 322 of the locking slide 304 are disposed between the interior side 307 of the sidewalls 306, 308 of the bracket frame 302. The distance between the exterior side 331 of the first sidewall 320 and the exterior side 331 of the second sidewall 320 of the locking slide 304 is configured to be less than the distance between the interior side 307 of the first sidewall 306 and the interior side 307 of the second sidewall 308 of the bracket frame 302 to allow for the locking slide 304 to mate between the sidewalls 306, 308 of the bracket frame 302.

FIG. 17 further depicts the retaining flange 347 of the first sidewall 320 and second sidewall 322. The retaining flange 347 includes ledges 348 that extend into the interior 329 at a right angle to the sidewalls 320, 322 and parallel to the base 303. The ledges 348 are offset from the base 303 at a slightly larger dimension than the height of the sidewalls 320, 322 of the locking slide 304 to allow the locking slide 304 to slidably mate with the bracket frame 302.

In the first mated position, the first detent 317 is engaged with the detent catch 346. In the first mated position, the detent catch 346 acts on the detent tab 321 of the first detent 317 to prevent the locking slide 304 from being removed from the first mated position.

Figure 18:
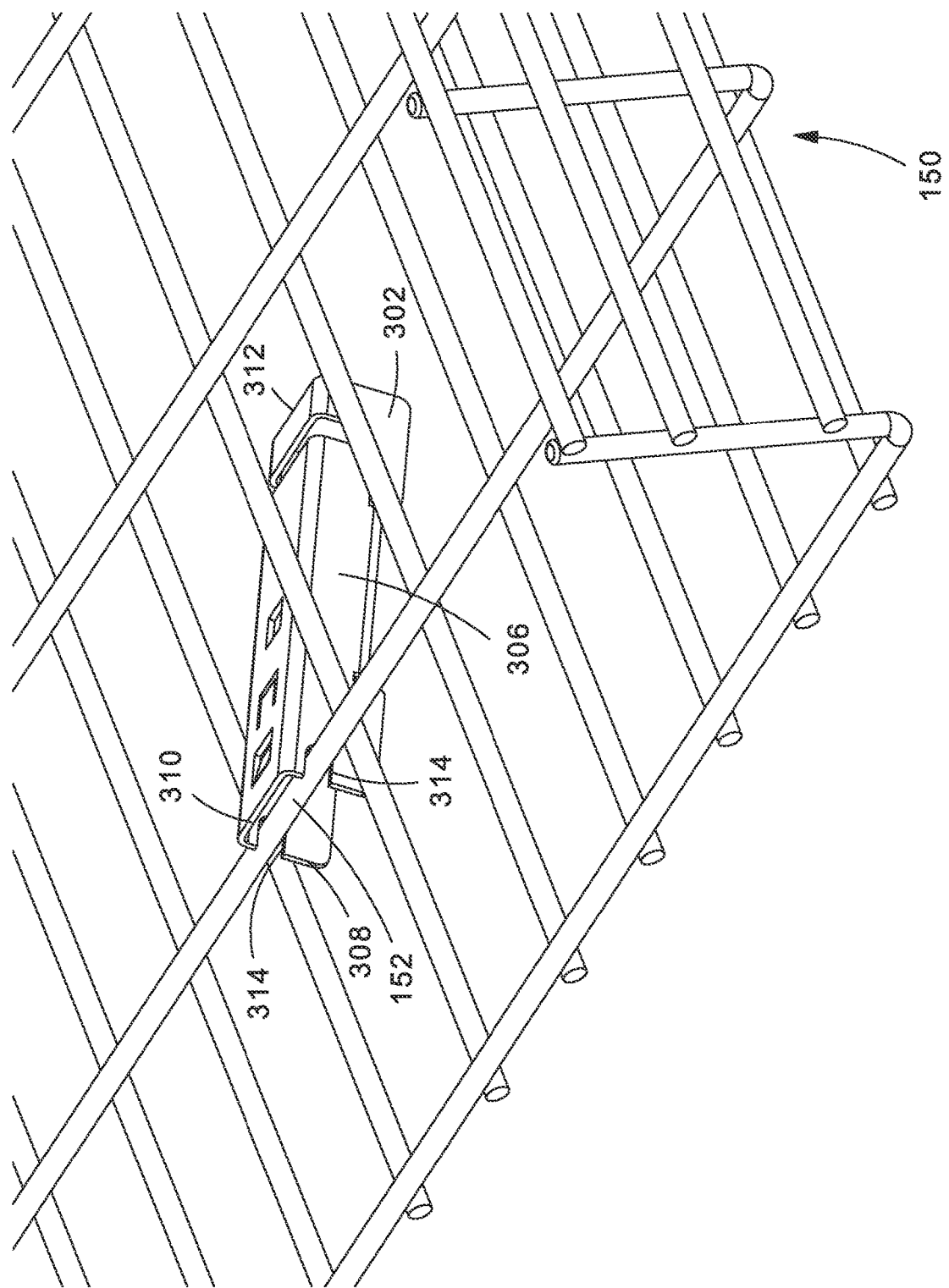
FIG. 18 is a perspective view of the bracket frame of FIG. 16 in an initial installation position on the wire basket.
Figure 19:
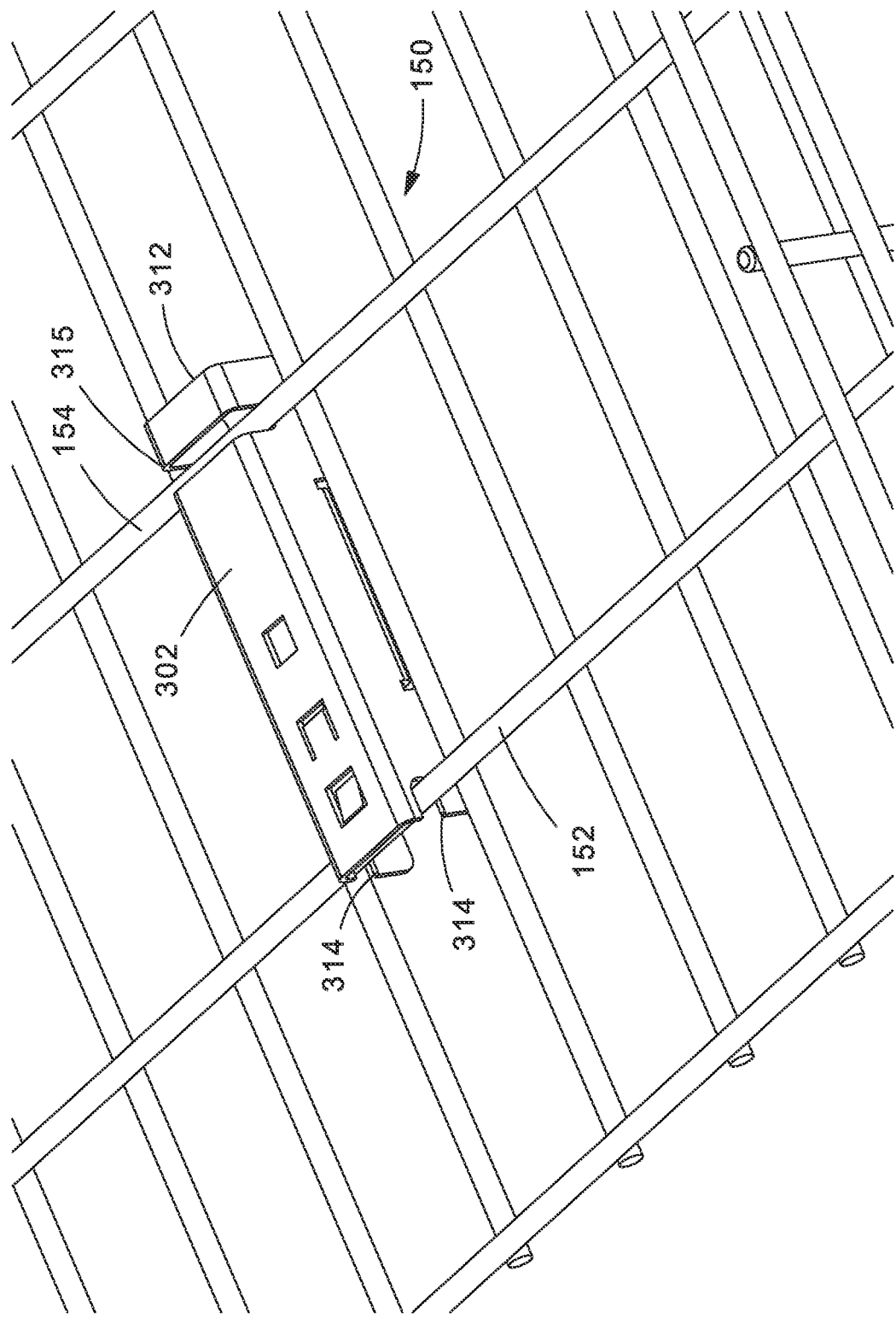
FIG. 19 is a perspective view of the bracket frame of FIG. 16 in a second installation position on the wire basket.

FIG. 18 depicts the bracket frame 302 in an initial install position. In the initial installation position, the first cross-wire 152 of the wire basket 150 resides within the wire basket slots 314 of the first sidewall 306 and second sidewall 308 of the bracket frame 302. The first end 310 of the bracket frame 302 is supported by the first cross-wire 152 of the wire basket 150. FIG. 19 depicts the bracket frame 302 in a second installation position. In the second installation position, the second cross-wire 154 of the wire basket 150 is inserted into the slot 315 adjacent the second end 312 of the bracket frame 302.

To orient the bracket frame 302 from the first position to the second position as depicted in FIG. 19, the bracket frame 302 is pivoted up about the engagement of the wire basket slot 314 and first cross-wire 152. As the bracket frame 302 is pivoted up, the second cross-wire 154 enters the slot 315 for engagement. The bracket frame 302 continues pivoting until the second cross-wire 154 reaches the bottom of the slot 315.

Figure 20:
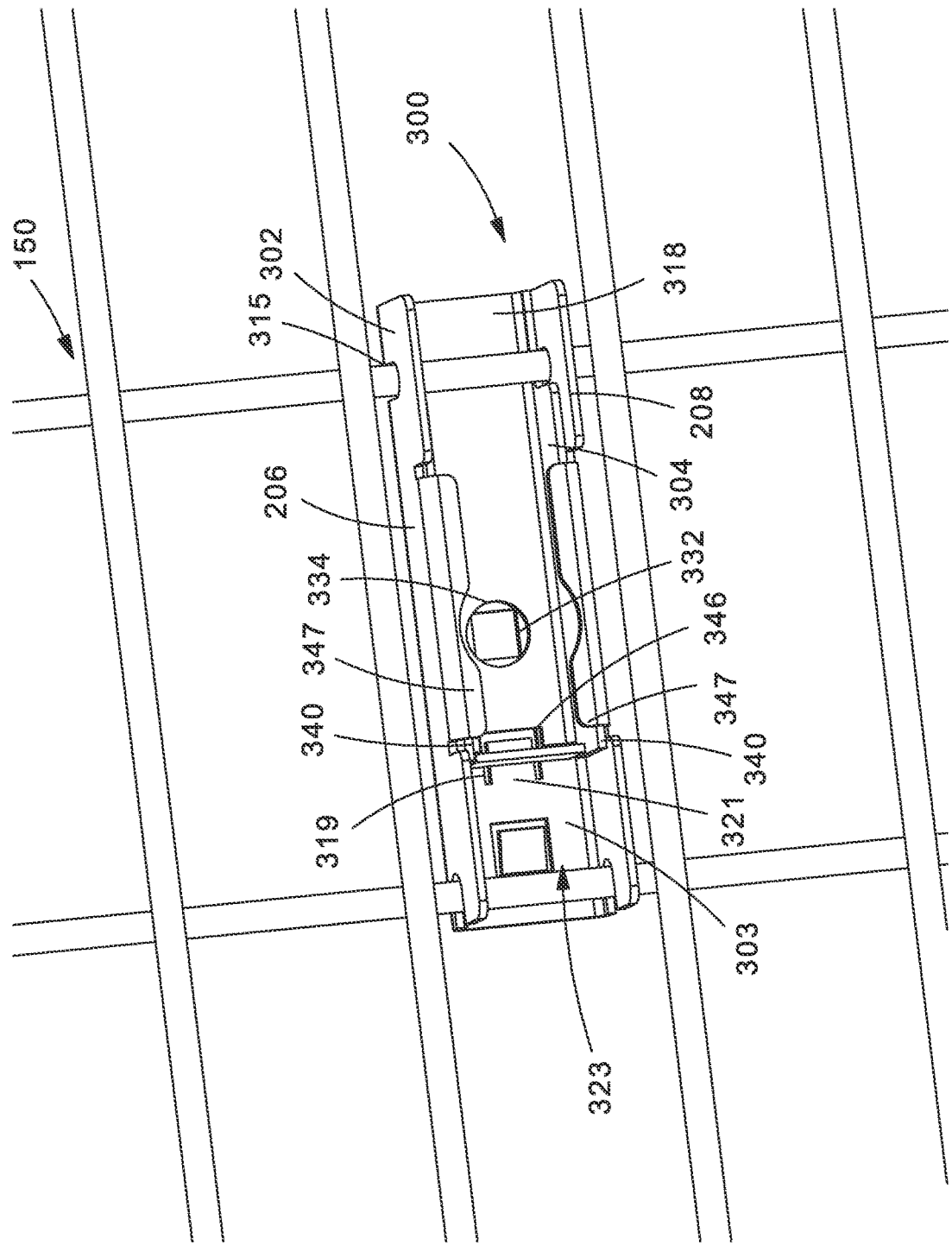
FIG. 20 is a bottom perspective view of wire basket bracket of FIG. 16 in an installed position with the wire basket.
Figure 21:
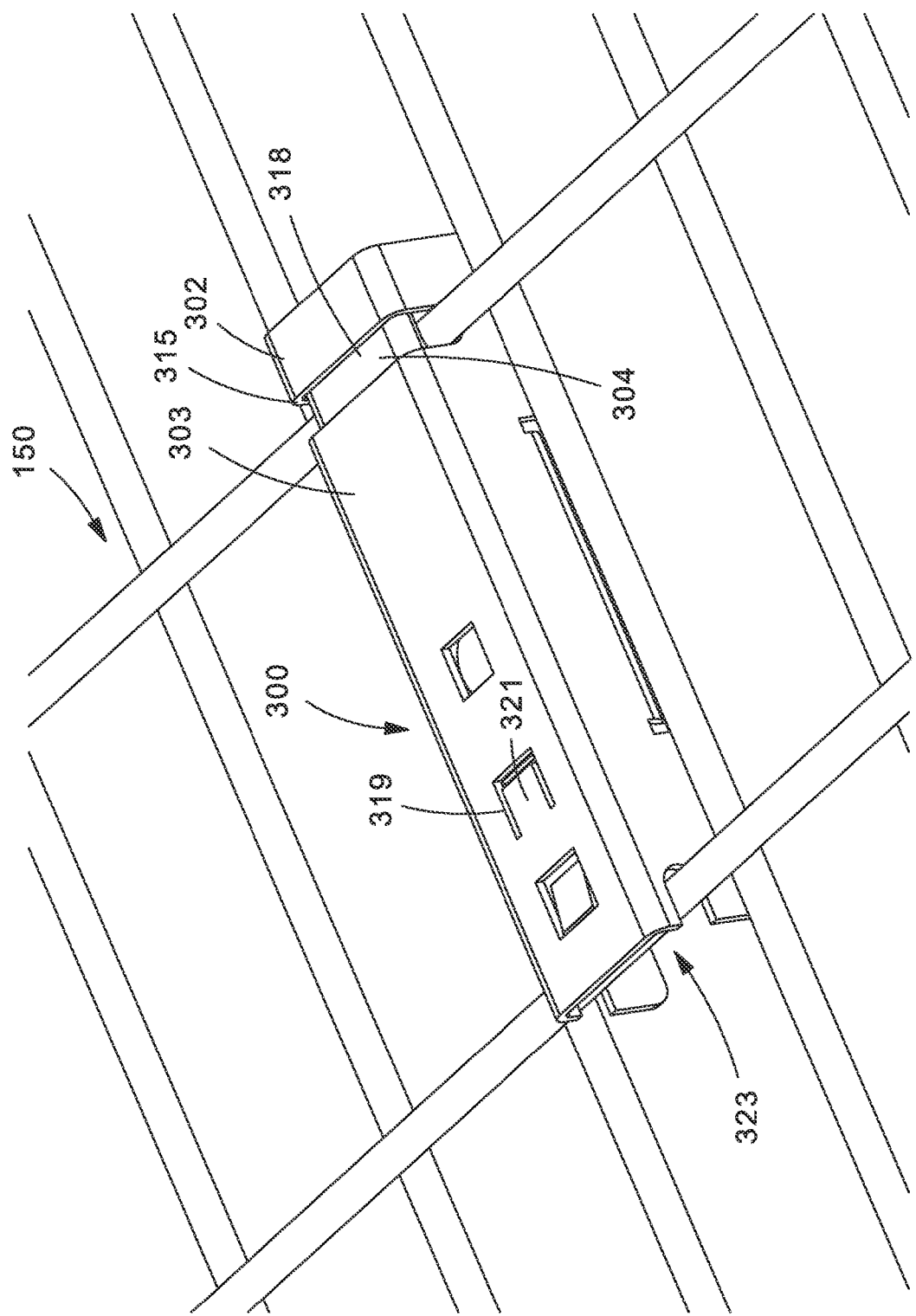
FIG. 21 is a top prospective of the installed wire basket bracket of FIG. 20.

FIGS. 20 and 21 depict the bracket frame 302 and locking slide 304 mated and installed to the wire basket 150 in a second mated position. FIG. 20 depicts a bottom prospective of the wire basket bracket 300. In the second mated position, the locking slide 304 is slid as far into the bracket frame 302 as the locking slide can travel before engagement of the stops 340 with the retaining flanges 347. FIG. 20 depicts the stops 340 engaged with the retaining flanges 347 of the first sidewall 306 and second sidewall 308, stopping any further forward movement by the locking slide 304. The through hole 332 of the bracket frame 302 is aligned with the through hole 334 of the locking slide 304.

FIGS. 20 and 21 depict the second end 318 of the locking slide 304 disposed between the second cross-wire 154 and the base 303 of the bracket frame 302. The orientation of the locking slide 304 is disposed between the second cross-wire 154 and the base 303 of the bracket frame 302. This orientation locks the wire basket bracket 300 to the wire basket 150 and prevents the second cross-wire 154 from being removed from the slot 315 of the bracket frame 302. The second detent 319 is positioned over the detent catch 346. The detent tab 321 of the second detent 319 may then be depressed into the interior 329 of the bracket frame 302 to prevent reward movement of the locking slide 304.

Figure 22:
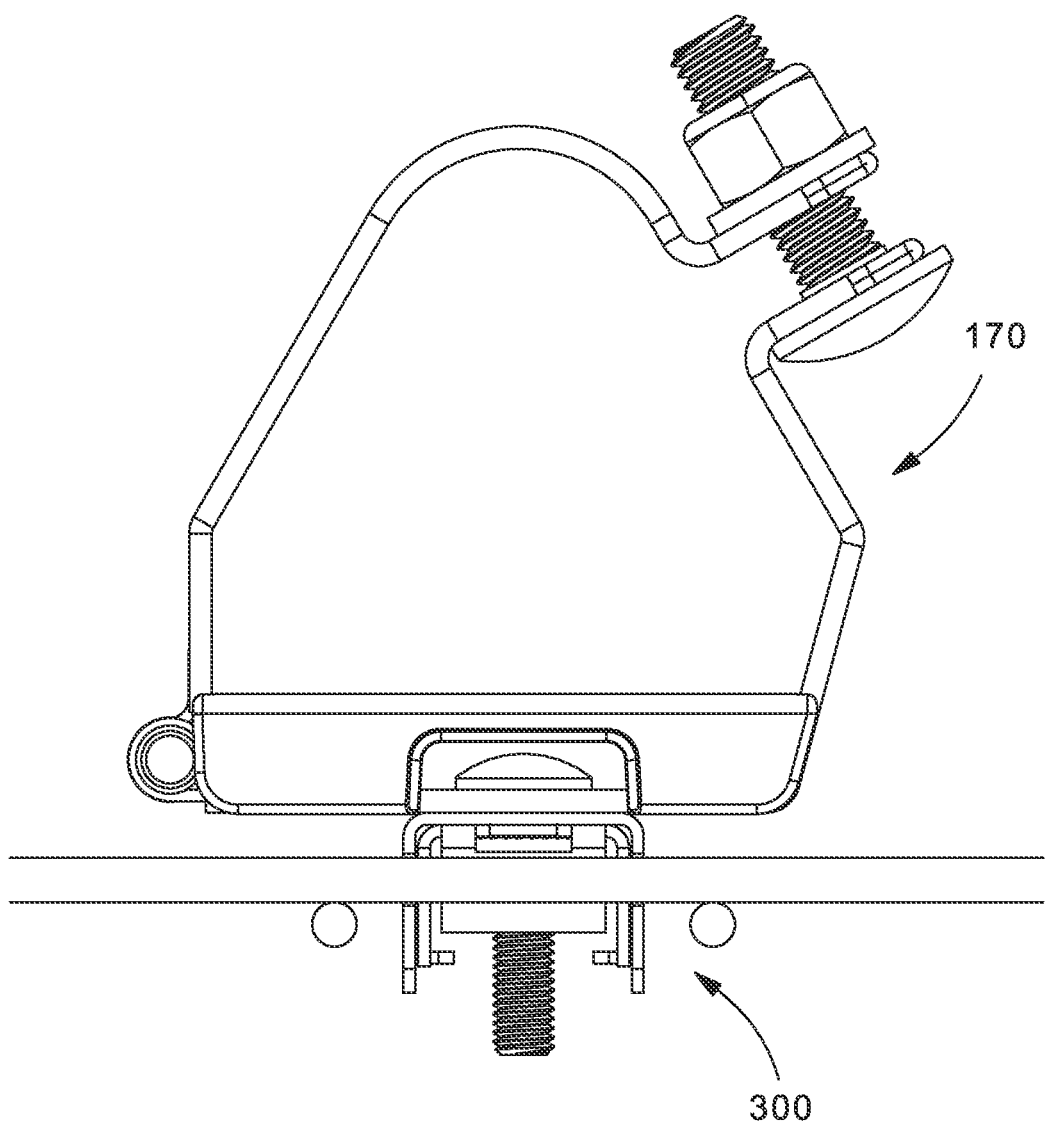
FIG. 22 is a front view of the wire basket bracket of FIG. 20 with cable cleat assembly attached thereto.

FIG. 22 depicts an installed position of the wire basket bracket 300 with a cable cleat assembly 170 as described above attached thereto.

The invention claimed is:

1. A method of installing a cable management system to a wire basket, wherein the method of installing comprising:
providing a wire basket having a first plurality of cross wires disposed parallel to each other, a second plurality of cross wires disposed parallel to each other and perpendicular to the first plurality of cross wires, wherein the first plurality of cross wires and the second plurality of cross wires form a grid with a plurality of openings;
providing a cable management system having a locking plate with a base and sidewalls, a bracket frame with a base and sidewalls, and a cable cleat assembly;
positioning the cable management system on the wire basket in a first position with the locking plate positioned through one of the plurality of openings in the grid and the bracket frame positioned on cross wires of the first plurality of cross wires of the wire basket, wherein the sidewalls of the locking plate are perpendicular to the sidewalls of the bracket frame; and
rotating the cable cleat assembly and the locking plate to an installed positioned with the sidewalls of the locking plate parallel to the sidewalls of the bracket frame.

2. The method of claim 1, wherein rotating the cable cleat assembly positions the cable cleat assembly to receive cables running a length of the wire basket.

3. The method of claim 1, further comprising a fastener for rotatably connecting the locking plate, bracket frame, and cable cleat assembly to each other.

4. The method of claim 3, wherein the base of the bracket frame having a through hole for receiving the fastener, the base of the locking plate having a through hole for receiving the fastener, the through hole in the base of the bracket frame is aligned with the through hole in the base of the locking plate.

5. The method of claim 4, wherein the through hole in the base of the bracket frame is circular and the through hole in the base of the locking plate is rectangular; wherein the fastener has a rectangular shoulder and the rectangular shoulder fits within the rectangular through hole in the base of the locking plate.

6. The method of claim 3, wherein rotation of the cable cleat assembly causes rotation of the locking plate through rotation of the fastener, and wherein the bracket frame remains stationary.

7. The method of claim 1, wherein the bracket frame and the locking plate only engage parallel cross wires of the first plurality of cross wires of the wire basket.

8. The method of claim 1, wherein the sidewalls of the bracket frame having notches for receiving the cross wires of the first plurality of cross wires of the wire basket.

9. The method of claim 8, wherein the notches are U-shaped.

10. The method of claim 1, wherein the locking plate is U-shaped and the bracket frame is U-shaped.

11. A cable management system comprising:
a wire basket having a first plurality of cross wires disposed parallel to each other, a second plurality of cross wires disposed parallel to each other and perpendicular to the first plurality of cross wires, wherein the first plurality of cross wires and the second plurality of cross wires form a grid with a plurality of openings;
a bracket frame having a base with a first sidewall extending from the base and a second sidewall extending from the base;
a locking plate rotatably connected to the bracket frame, the locking plate having a base with a first sidewall extending from the base and a second sidewall extending from the base;
a cable cleat assembly rotatably connected to the bracket frame;

wherein the locking plate is positioned through one of the plurality of openings in the grid of the wire basket in an initial position; the first sidewall and the second sidewall of the locking plate are perpendicular to the first sidewall and the second sidewall of the bracket frame in the initial position; and wherein the locking plate is rotated to an installed position with cross wires of the first plurality of cross wires positioned on the base of the locking plate, and the first sidewall and the second sidewall of the locking plate positioned parallel to the first sidewall and the second sidewall of the bracket frame.

12. The cable management system of claim 11, wherein the first sidewall and the second sidewall of the bracket frame having notches for receiving cross wires of the first plurality of cross wires of the wire basket.

13. The cable management system of claim 12, wherein the notches are U-shaped.

14. The cable management system of claim 11, wherein the locking plate is U-shaped and the bracket frame is U-shaped.

15. The cable management system of claim 11, wherein the cable cleat assembly rotates with the locking plate from the initial position to the installed position with the cable cleat assembly positioned to receive cables running a length of the wire basket in the installed position.

16. The cable management system of claim 11, further comprising a fastener for rotatably connecting the locking plate, bracket frame, and cable cleat assembly to each other.

17. The cable management system of claim 16, wherein the base of the bracket frame having a through hole for receiving the fastener, the base of the locking plate having a through hole for receiving the fastener, the through hole in the base of the bracket frame is aligned with the through hole in the base of the locking plate.

18. The cable management system of claim 17, wherein the through hole in the base of the bracket frame is circular and the through hole in the base of the locking plate is rectangular; wherein the fastener has a rectangular shoulder and the rectangular shoulder fits within the rectangular through hole in the base of the locking plate.

19. The cable management system of claim 16, wherein rotation of the cable cleat assembly causes rotation of the locking plate through rotation of the fastener, and wherein the bracket frame remains stationary.

20. The cable management system of claim 11, wherein the bracket frame and the locking plate only engage parallel cross wires of the first plurality of cross wires of the wire basket.

\* \* \* \* \*